(12) United States Patent
Maric et al.

(10) Patent No.: US 12,360,367 B2
(45) Date of Patent: Jul. 15, 2025

(54) DISPLAY AND VISION CORRECTION SYSTEM WITH REMOVABLE LENS

(71) Applicant: Apple Inc., Cupertino, CA (US)

(72) Inventors: Ivan S. Maric, Sunnyvale, CA (US); Andreas G. Weber, Los Altos, CA (US); Anna V. Mirabella, Palo Alto, CA (US); Benjamin A. Shaffer, San Jose, CA (US); Forrest C. Wang, Petaluma, CA (US); Jason C. Sauers, Sunnyvale, CA (US); Jeremy C. Franklin, San Francisco, CA (US); Julian Hoenig, San Francisco, CA (US); Julian Jaede, San Francisco, CA (US); Kristi E. Bauerly, Los Altos, CA (US); Stephen E. Dey, San Francisco, CA (US); Wey-Jiun Lin, Los Altos Hills, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/905,296

(22) Filed: Jun. 18, 2020

(65) Prior Publication Data
US 2020/0400948 A1    Dec. 24, 2020

Related U.S. Application Data

(60) Provisional application No. 62/864,664, filed on Jun. 21, 2019.

(51) Int. Cl.
*G02B 27/01*    (2006.01)
*G02C 7/02*    (2006.01)
(Continued)

(52) U.S. Cl.
CPC ....... *G02B 27/017* (2013.01); *G02B 27/0172* (2013.01); *G02B 27/0176* (2013.01);
(Continued)

(58) Field of Classification Search
CPC .. G02B 27/01; G02B 27/017; G02B 27/0172; G02B 27/0176; G02B 2027/0156;
(Continued)

(56) References Cited

U.S. PATENT DOCUMENTS 2,857,776 A    10/1958    Williams et al.
3,288,143 A  *  11/1966    Federbush .............. B42F 13/28
                                                                          D19/27
(Continued)

FOREIGN PATENT DOCUMENTS

CN    101165543 A    4/2008
CN    103852891 A    6/2014
(Continued)

OTHER PUBLICATIONS

Reddit.com, Author Unknown, Posted by u/macegr 4 years ago, "Made some magnetic quick-change prescription lens adapters for DK2", https://www.reddit.com/r/oculus/comments/2t5b9u/made_some_magnetic_quickchange_prescription_lens/, Downloaded Jun. 13, 2019 (3 pp).

(Continued)

*Primary Examiner* — Jason M Mandeville
(74) *Attorney, Agent, or Firm* — Young Basile Hanlon & MacFarlane, P.C.

(57) ABSTRACT

A display and vision correction system includes a head-mounted display unit, a glasses frame, and a removable lens assembly. The head-mounted display unit is configured to be worn on a head of a user and includes a display for providing graphical content to the user. The glasses frame is configured to be worn on the head of the user. The removable lens assembly is removably coupleable to the head-mounted display unit and to the glasses frame. The removable lens assembly includes a corrective lens element.

23 Claims, 19 Drawing Sheets

(51) Int. Cl.
*G02C 9/00* (2006.01)
*G02C 9/02* (2006.01)
*G02C 9/04* (2006.01)

(52) U.S. Cl.
CPC .............. *G02C 7/022* (2013.01); *G02C 9/00* (2013.01); *G02C 9/02* (2013.01); *G02B 2027/0156* (2013.01); *G02B 2027/0161* (2013.01); *G02B 2027/0178* (2013.01); *G02C 9/04* (2013.01); *G02C 2200/02* (2013.01); *G02C 2200/08* (2013.01)

(58) Field of Classification Search
CPC .... G02B 2027/0161; G02B 2027/0178; G02C 7/022; G02C 2200/02; G02C 2200/08; G02C 9/00; G02C 9/02; G02C 9/04
USPC ............................................................ 345/8
See application file for complete search history.

(56) References Cited

U.S. PATENT DOCUMENTS

| | | | |
|---|---|---|---|
| 5,321,442 A * | 6/1994 | Albanese ................. | G02C 1/06 351/86 |
| 5,937,702 A | 8/1999 | Erikson et al. | |
| 5,954,642 A | 9/1999 | Johnson et al. | |
| 6,202,500 B1 | 3/2001 | Erikson et al. | |
| 6,204,974 B1 | 3/2001 | Spitzer | |
| 6,293,671 B1 * | 9/2001 | Masunaga ................. | G02C 1/02 351/41 |
| 6,415,673 B1 | 7/2002 | Erikson et al. | |
| 6,480,174 B1 | 11/2002 | Kaufmann et al. | |
| 6,893,124 B1 * | 5/2005 | Kurtin ...................... | G02C 9/00 351/57 |
| 7,048,370 B2 * | 5/2006 | Starner ..................... | G02C 9/00 351/158 |
| 7,059,182 B1 | 6/2006 | Ragner | |
| 7,320,514 B2 * | 1/2008 | Smith ....................... | G02C 9/00 351/57 |
| 8,355,208 B1 | 1/2013 | Baker et al. | |
| 8,413,532 B2 | 4/2013 | Wu | |
| 8,659,433 B2 | 2/2014 | Petrou | |
| 9,651,788 B2 | 5/2017 | Osterhout et al. | |
| 9,733,480 B2 | 8/2017 | Baek et al. | |
| 10,338,410 B1 | 7/2019 | Richards | |
| 10,386,647 B1 | 8/2019 | Yu et al. | |
| 10,591,736 B1 | 3/2020 | Bristol et al. | |
| 11,042,649 B1 | 6/2021 | John et al. | |
| 11,163,166 B1 | 11/2021 | Ebert | |
| 11,402,635 B1 | 8/2022 | Zannoli et al. | |
| 12,298,519 B2 | 5/2025 | Franklin et al. | |
| 2001/0055947 A1 | 12/2001 | McCabe | |
| 2002/0089639 A1 * | 7/2002 | Starner ..................... | G02C 9/00 351/57 |
| 2004/0003453 A1 | 1/2004 | Urakawa et al. | |
| 2006/0268220 A1 * | 11/2006 | Hogan ..................... | G02C 7/088 351/47 |
| 2008/0042038 A1 | 2/2008 | Pombo | |
| 2008/0186445 A1 | 8/2008 | Van Atta et al. | |
| 2009/0159408 A1 | 6/2009 | Sunder | |
| 2011/0213664 A1 | 9/2011 | Osterhout et al. | |
| 2013/0022220 A1 | 1/2013 | Dong et al. | |
| 2013/0069787 A1 | 3/2013 | Petrou | |
| 2013/0185849 A1 | 7/2013 | Laughlin et al. | |
| 2013/0346168 A1 | 12/2013 | Zhou et al. | |
| 2014/0098009 A1 | 4/2014 | Prest et al. | |
| 2014/0232619 A1 | 8/2014 | Hiraide | |
| 2014/0300860 A1 | 10/2014 | Tanaka et al. | |
| 2015/0103152 A1 | 4/2015 | Qin | |
| 2015/0103306 A1 | 4/2015 | Kaji et al. | |
| 2015/0355481 A1 | 12/2015 | Hilkes et al. | |
| 2016/0147070 A1 | 5/2016 | Border et al. | |
| 2016/0219202 A1 | 7/2016 | Barros et al. | |
| 2016/0266412 A1 | 9/2016 | Yoshida | |
| 2016/0320612 A1 | 11/2016 | Zhang | |
| 2016/0357020 A1 | 12/2016 | Hwang et al. | |
| 2016/0363773 A1 | 12/2016 | Tempel et al. | |
| 2016/0370590 A1 | 12/2016 | Fujishiro | |
| 2017/0031435 A1 * | 2/2017 | Raffle ................... | G02B 27/017 |
| 2017/0127933 A1 | 5/2017 | Widman et al. | |
| 2017/0344114 A1 | 11/2017 | Osterhout et al. | |
| 2018/0157043 A1 | 6/2018 | Yi et al. | |
| 2018/0157320 A1 | 6/2018 | Trail | |
| 2018/0203505 A1 | 7/2018 | Trail et al. | |
| 2018/0283741 A1 | 10/2018 | Bei et al. | |
| 2018/0335605 A1 | 11/2018 | Chou et al. | |
| 2018/0338130 A1 | 11/2018 | Miller et al. | |
| 2019/0041644 A1 | 2/2019 | Abele et al. | |
| 2019/0056590 A1 | 2/2019 | Chuang et al. | |
| 2019/0187490 A1 * | 6/2019 | Dominguez ............. | G02C 9/00 |
| 2019/0285894 A1 | 9/2019 | Tian et al. | |
| 2020/0093200 A1 | 3/2020 | Mohapatra et al. | |
| 2020/0096775 A1 * | 3/2020 | Franklin ............. | G02B 27/0172 |
| 2020/0371360 A1 | 11/2020 | Dalrymple et al. | |
| 2021/0141212 A1 | 5/2021 | Jacoby et al. | |
| 2022/0019093 A1 * | 1/2022 | Mackay ............... | G02C 13/003 |

FOREIGN PATENT DOCUMENTS

| | | |
|---|---|---|
| CN | 104158433 A | 11/2014 |
| CN | 104898277 A | 9/2015 |
| CN | 204883054 U | 12/2015 |
| CN | 105319717 A | 2/2016 |
| CN | 205581416 U | 9/2016 |
| CN | 205581421 U | 9/2016 |
| CN | 106444025 A | 2/2017 |
| CN | 206057681 U | 3/2017 |
| CN | 206096621 U | 4/2017 |
| CN | 206133119 U | 4/2017 |
| CN | 106950694 A | 7/2017 |
| CN | 206321880 U | 7/2017 |
| CN | 107577052 A | 1/2018 |
| CN | 206863342 U | 1/2018 |
| CN | 206960775 U | 2/2018 |
| CN | 207232515 U | 4/2018 |
| CN | 207440403 U | 6/2018 |
| CN | 207440405 U | 6/2018 |
| CN | 207440406 U | 6/2018 |
| CN | 207752244 U | 8/2018 |
| CN | 207780366 U | 8/2018 |
| CN | 208872948 U | 5/2019 |
| CN | 209148977 U | 7/2019 |
| CN | 210803870 U | 6/2020 |
| DE | 10311972 A1 | 9/2004 |
| EP | 3139251 A1 | 3/2017 |
| EP | 3441811 A1 | 2/2019 |
| FR | 2894683 A1 | 6/2007 |
| JP | H07333552 A | 12/1995 |
| JP | H09-101489 A | 4/1997 |
| JP | H09503595 A | 4/1997 |
| JP | 2002-090687 A | 3/2002 |
| JP | 2003228623 A | 8/2003 |
| JP | 2004-177849 A | 6/2004 |
| JP | 2007328156 A | 12/2007 |
| JP | 2009109442 A | 5/2009 |
| JP | 2009519482 A | 5/2009 |
| JP | 2011233080 A | 11/2011 |
| JP | 5126682 B2 | 1/2013 |
| JP | 2013088538 A | 5/2013 |
| JP | 2014102860 A | 6/2014 |
| JP | 2017-011436 A | 1/2017 |
| JP | 2017523481 A | 8/2017 |
| JP | 2018004950 A | 1/2018 |
| JP | 2019-500068 A | 1/2019 |
| JP | 6465030 B2 | 2/2019 |
| KR | 20140066258 A | 5/2014 |
| KR | 101455714 B1 | 11/2014 |
| WO | 2010067758 A1 | 6/2010 |
| WO | 2015/079610 A1 | 6/2015 |
| WO | 2015107817 A1 | 7/2015 |
| WO | 2016135727 A1 | 9/2016 |
| WO | 2016186257 A1 | 11/2016 |

(56) References Cited

FOREIGN PATENT DOCUMENTS

| WO | 2018003205 A1 | 1/2018 |
| WO | 2018120751 A1 | 7/2018 |
| WO | 2018213010 A1 | 11/2018 |

OTHER PUBLICATIONS

Vive Report, Author: dgtlhrt, "Fresh Eyes: A Story Of Clarity, Comfort & VR Lens Lab", Sep. 17, 2017, https://vivereport.com/2017/09/27/fresh-eyes-a-story-of-clarity-comfort-vr-lens-lab/, (6 pp).
VR Cover, Author Unknown, "VR Lens Lab, Prescription Lenses in VR", Downloaded Jun. 13, 2019, https://vrcover.com/prescription-lenses-in-vr/ (3 pp).
VR Lens Lab, Posted by Jay, "Free spacer for your Oculus Rift adapter and new RABS lens technology with minimal distortions", https://vr-lens-lab.com/oculus-rift-spacer-and-rabs-lens-technolohy/, Oct. 10, 2016 (4 pp).
International Search Report and Written Opinion in co-pending International Patent Application No. PCT/US2019/051077 mailed Nov. 26, 2019 (12 pp).
International Search Report and Written Opinion issued in co-pending International Application No. PCT/US2020/026134 dated Jul. 15, 2020 (14 pp).
International Search Report and Written Opinion in co-pending International Application No. PCT/US2020/038438 mailed Sep. 9, 2020 (14 pp).

\* cited by examiner

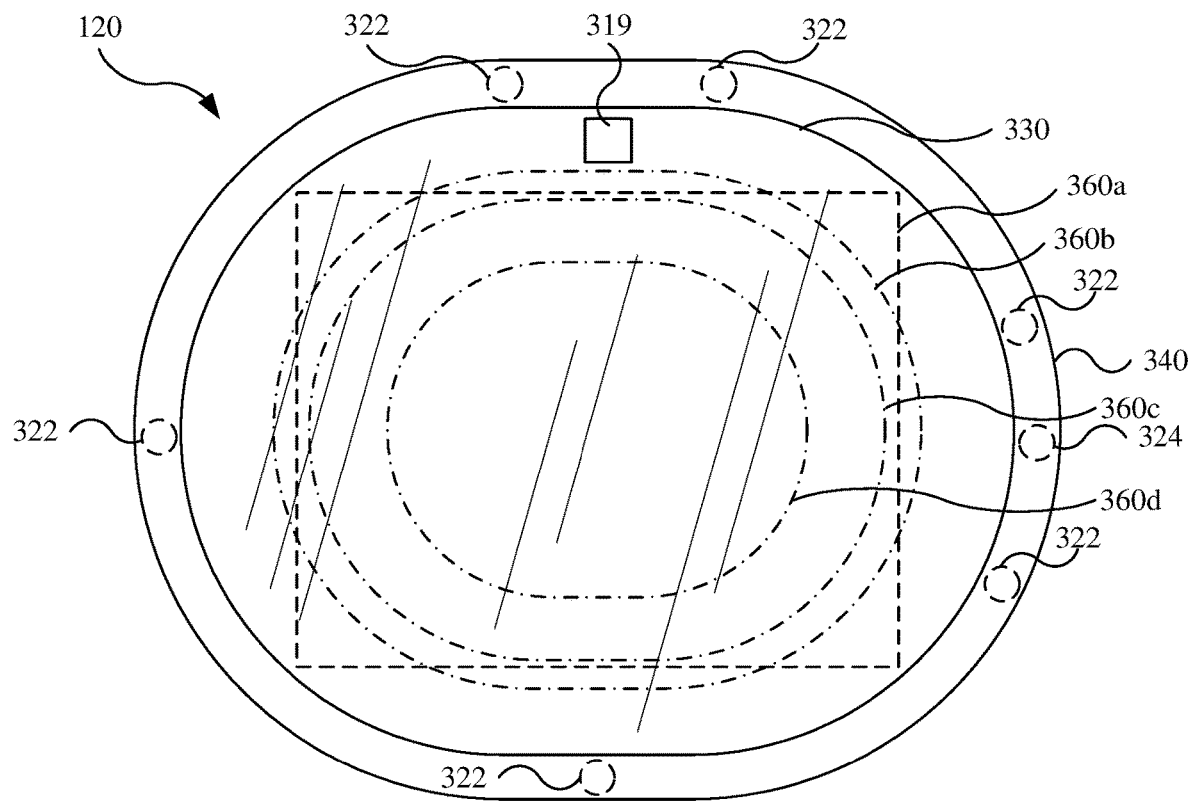
FIG. 4
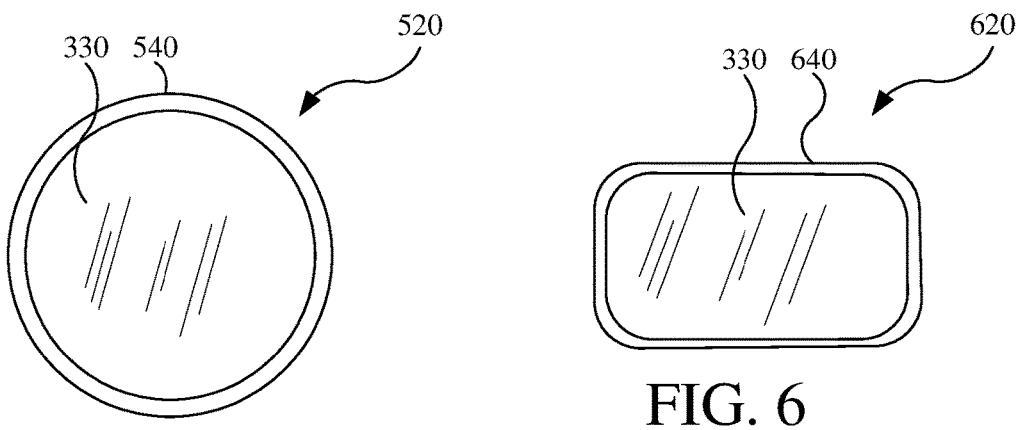
FIG. 5
FIG. 6

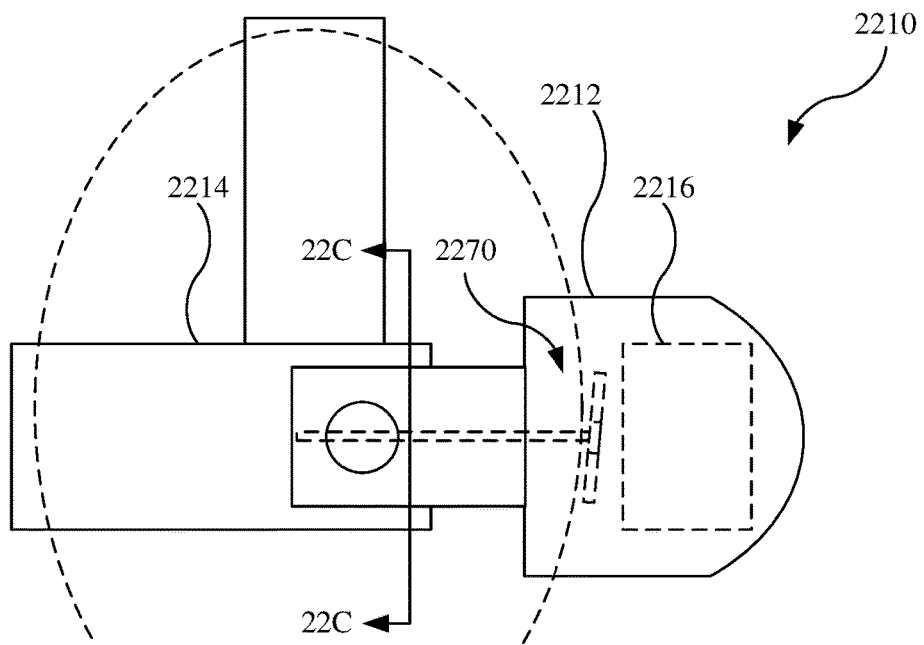
FIG. 22A
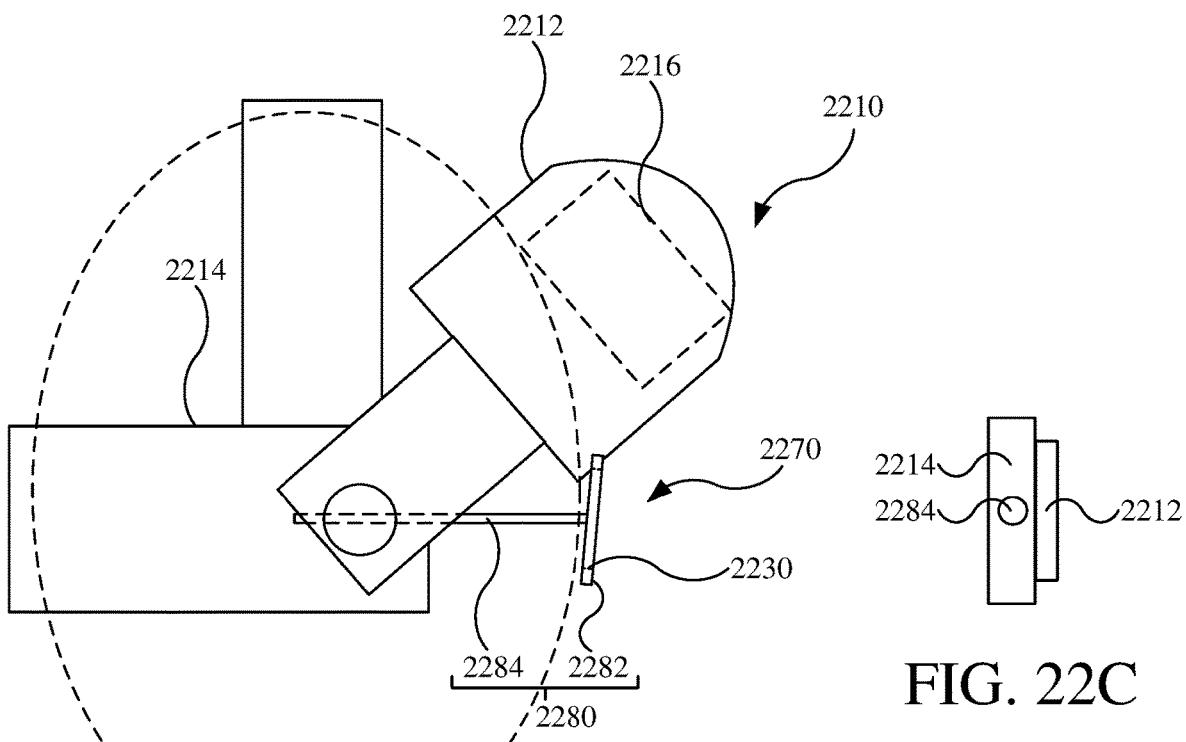
FIG. 22B
FIG. 22C

DISPLAY AND VISION CORRECTION SYSTEM WITH REMOVABLE LENS

CROSS-REFERENCE TO RELATED APPLICATION(S)

This application claims priority to and the benefit of U.S. Provisional Application No. 62/864,664, filed Jun. 21, 2019, the entire disclosure of which is incorporated by reference herein.

TECHNICAL FIELD

This disclosure relates to display systems and, in particular, head-mounted display systems.

BACKGROUND

A head-mounted display (HMD) is a display device that is worn on a head of a user includes one or more display modules for displaying graphics to the user. Different users may have different refractive errors of their eyes, such that different users require different corrective lenses.

SUMMARY

Disclosed herein are implementations of display systems. In one implementation, a display system includes a display, a removable lens assembly, and a lens detection sensor. The removable lens is removably coupleable to the display. The lens detection sensor detects the removable lens assembly coupled to the display. The display system may further include a head-mounted display unit that includes the display and the lens detection sensor. The display system may determine lens information from the removable lens with the lens detection sensor, and may provide an indicator of the removable lens according to the lens information.

In another implementation, a method is provided for operating a head-mounted display unit, which includes identifying a removable lens coupled to a display module of the head-mounted display unit, and providing an indication according to the identifying of the removable lens. The indication may be a configuration indication that differs between the removable lens and another removable lens coupleable to the display module. The method may further include identifying a user, while the indication may be a compatibility indication of compatibility between the removable lens and the user.

In another implementation, a display system includes a head-mounted display unit and a removable lens assembly. The head-mounted display unit includes a display module. The removable lens assembly includes a lens element and a frame coupled to the lens element. The removable lens assembly may be removably to the display module in a single orientation with a magnetic attachment features coupled to the frame and surrounding the lens element. The removable lens assembly may be removably coupleable to the display module with an interference fit, for example, with the removably lens include a compliant annular protrusion that receives a lens mount of the display module axially therein. The removable lens assembly may be removably coupleable to the display module with sprung latch mechanisms.

In an implementation, a display system includes a head-mounted display unit and a removable lens assembly. The head mounted display unit includes a display module and a corresponding mechanical coupling feature. The removable lens assembly includes a corrective lens element, a frame coupled to the corrective lens element, and a mechanical coupling feature coupled to the frame. The mechanical coupling feature is receivable by the corresponding mechanical coupling feature to removably couple the removable lens assembly to the head-mounted display unit. The mechanical coupling feature may engage the corresponding mechanical coupling feature to prevent movement of the removable lens assembly relative to the head-mounted display unit transverse to, along, and/or about an optical axis of the corrective lens element. The removable lens assembly may further include a magnetic coupling feature spaced part from the mechanical coupling feature and by which the removable lens assembly is magnetically coupleable to the head-mounted display unit. The display module may include a lens mount that includes the corresponding mechanical coupling feature, and the removable lens assembly may be removably coupleable to the display module.

In an implementation, a display and vision correction system includes a head-mounted display unit, a glasses frame, and a removable lens assembly. The head-mounted display unit is configured to be worn on a head of a user and includes a display for providing graphical content to the user. The glasses frame is configured to be worn on the head of the user. The removable lens assembly is removably coupleable to the head-mounted display unit and to the glasses frame. The removable lens assembly includes a corrective lens element.

The removable lens assembly may include a magnetic coupling feature and a mechanical coupling feature for removably coupling the removable lens assembly to the head-mounted display unit and to the glasses frame. The mechanical coupling feature may include a male component that is receivable by female components of the head-mounted display unit and of the glasses frame to prevent relative movement of the removable lens assembly in directions transverse to and along an optical axis of the corrective lens element. The head-mounted display unit may engage a first set of facial datums of the user to locate the corrective lens element in a first wear position relative to the user, which includes a brow of the user. The glasses frame may engage a second set of facial datums of the user to locate the corrective lens element in a second wear position relative to the user, which may the ears of the user.

In an implementation, a method for vision correction includes providing a removable lens assembly having a corrective lens element and a first coupling feature. The first coupling feature corresponds to a second coupling feature of a head-mounted display unit for coupling the removable lens assembly to the head-mounted display unit and corresponds to a third coupling feature of a glasses frame for coupling the removable lens assembly to the glasses frame.

In an implementation, a removable lens assembly having a corrective lens element and a first mechanical coupling feature coupled to the corrective lens element. The first mechanical coupling feature is insertable into a second mechanical coupling feature of a head-mounted display unit to prevent movement of the corrective lens element relative to the head-mounted display unit in directions transverse to and along an optical axis of the corrective lens element. The mechanical coupling feature is also insertable into a third mechanical coupling feature of a glasses frame to prevent movement of the corrective lens element relative to the glasses frame in directions transverse to the optical axis of the corrective lens element.

BRIEF DESCRIPTION OF THE DRAWINGS

FIG. 4 is a rear view of a removable lens of the display system of FIG. 1 with light emission, entry, and exit points illustrated by dashed lines (i.e., dash-dot lines).

FIG. 5 is a rear view of another embodiment of a removable lens.

FIG. 6 is a rear view of another embodiment of a removable lens.

FIG. 22A is a side schematic view of a person wearing a head-mounted display unit in a lowered configuration.

FIG. 22B is a side schematic view of the person wearing the head-mounted display unit of FIG. 22A in a raised configuration.

FIG. 22C is a cross-sectional view of a glasses assembly and the head-mounted display unit of FIG. 22A taken along line 22C-22C.

DETAILED DESCRIPTION

Disclosed herein are embodiments of display systems that include a head-mounted display unit and one or more interchangeable lenses. The interchangeable lenses may be configured according to characteristics of different eyes of different users (e.g., according to an eyeglass prescription). For example, one pair of interchangeable lenses may be associated with (e.g., prescribed for) one user, while another pair of interchangeable. lenses may be associated with another user. The interchangeable lenses are mountable to the head-mounted display unit in an interchangeable manner such that different lenses may be mounted to the head-mounted display unit to accommodate different users with different eye characteristics. The interchangeable lenses may be mounted to the head-mounted display unit in various different manners. The display system may also identify, e.g., determine an identity of, the interchangeable lenses mounted to the head-mounted display unit and/or identify the user and perform various operations in response thereto.

Figure 1:
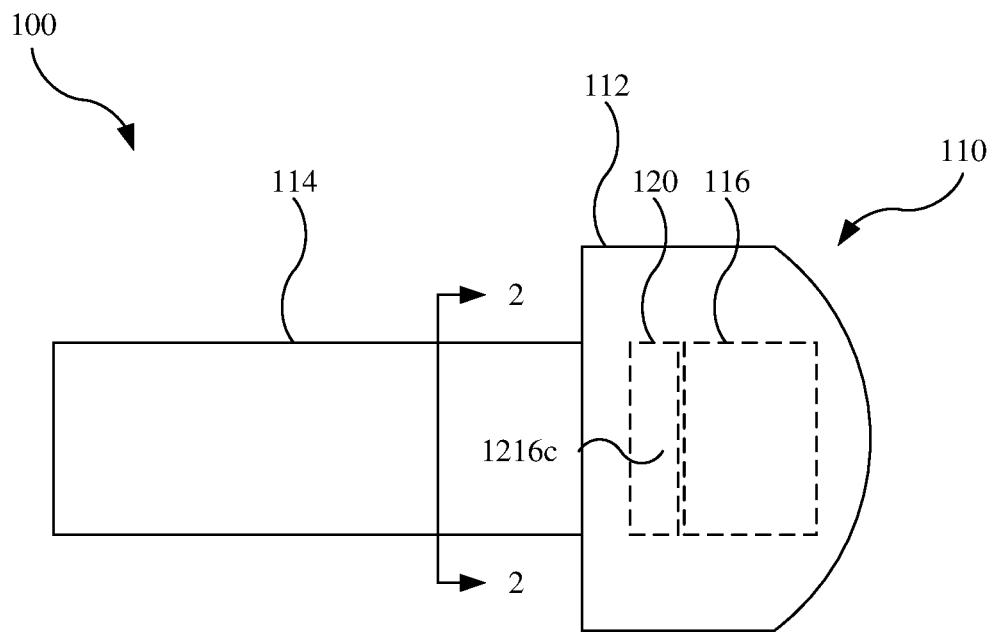
FIG. 1 is a side view of a display system with hidden components illustrated in dashed lines.
Figure 2:
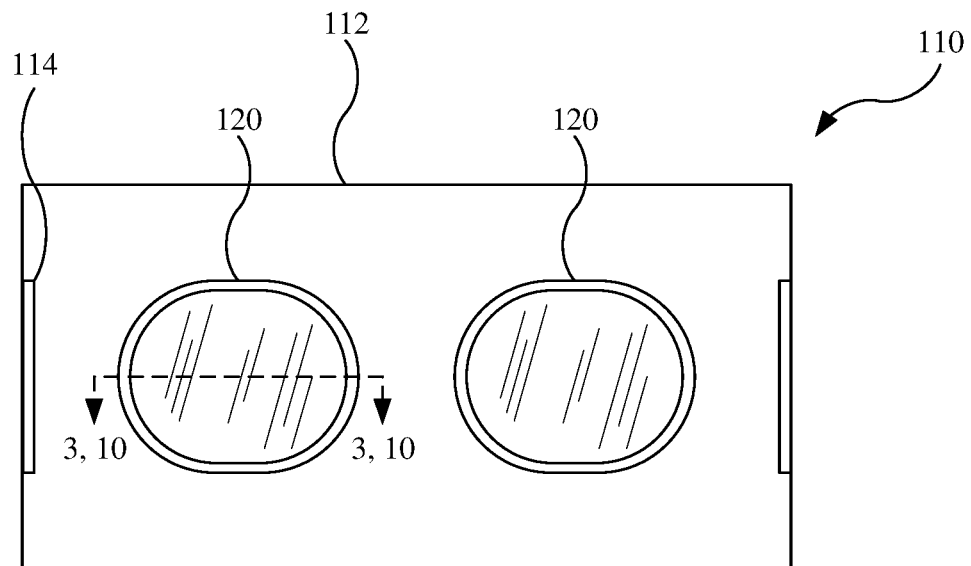
FIG. 2 is a cross-sectional view of the display system of FIG. 1 taken along line 2-2 in FIG. 1.

Referring to FIGS. 1 and 2, a display system 100 generally includes a head-mounted display unit 110 and one or more removable lens assemblies 120. The head-mounted display unit 110 generally includes a housing 112, a head support 114, one or more display modules 116 (e.g., two; one for each eye), and various other electronics (e.g., controller or computing device, communications interface, audio input and/or output devices, sensors, battery or other power electronics; see also FIG. 12). The display system 100 is configured to provide a computer-generated reality (e.g., virtual reality or mixed reality) in which case the display system 100 may be considered a computer-generated reality system or computer-generated reality display system, a virtual reality system or a virtual reality display system, or a mixed reality display system or mixed reality system. The terms computer-generated reality, virtual reality, and mixed reality are discussed in further detail below.

The housing 112 contains or is otherwise coupled to the one or more display modules 116 and the other electronics. The housing 112 may also include various compliant components coupled thereto for engaging the face of the user to be supported thereon (not shown). The head support 114 is coupled to the housing 112 to support the head-mounted display unit 110 on a head of a user with the one or more display modules 116 in suitable positions relative to eyes of the user. As shown, the head support 114 may be configured as a strap or band that is configured to extend around the head of the user. The display module 116 is coupled to the housing 112 in a fixed position (as shown).

Figure 3A:
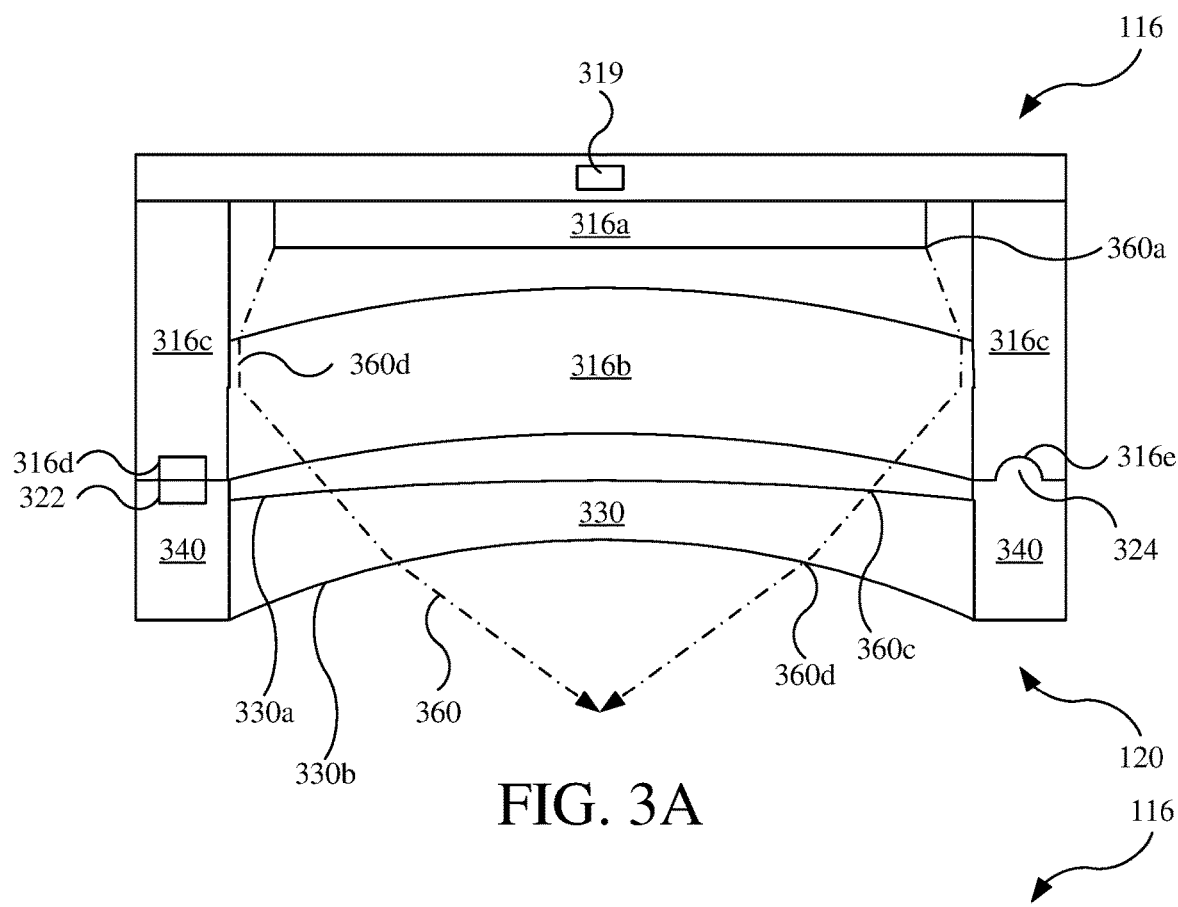
FIG. 3A is a cross-sectional view of a display unit and interchangeable lens assembly of the display system of FIG. 1 taken along line 3-3 in FIG. 2 and shown in an assembled state.
Figure 3B:
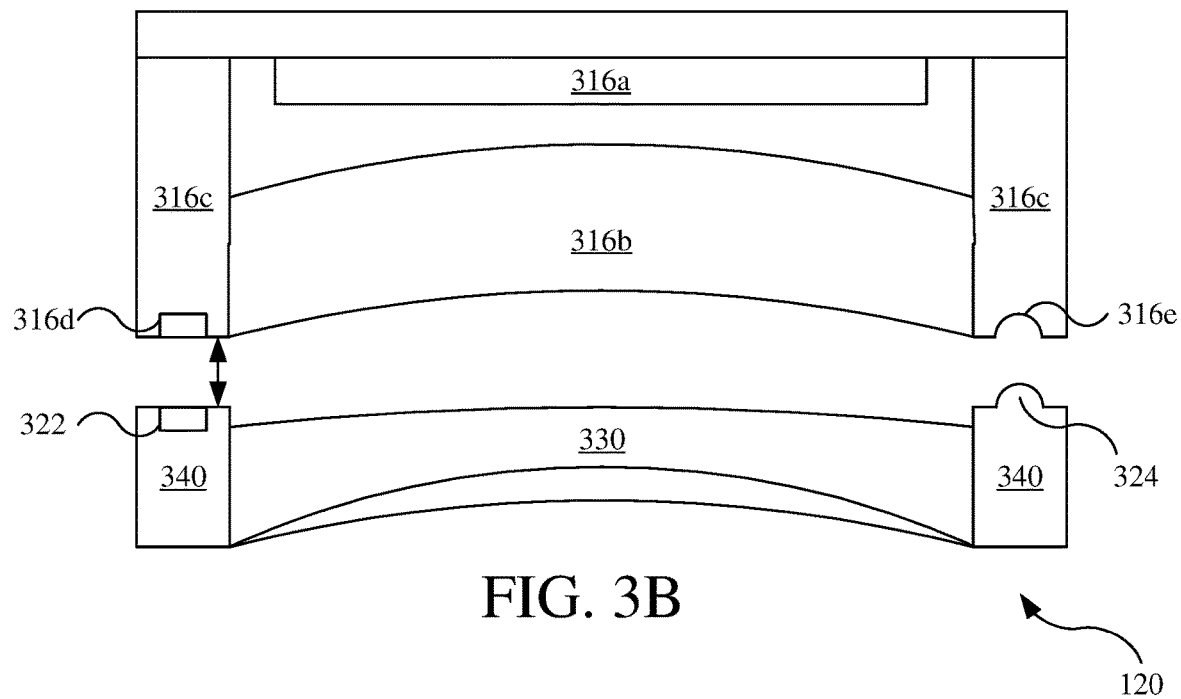
FIG. 3B is a cross-sectional view of the display unit and the interchangeable lens assembly of FIG. 3A shown in a disassembled state.

Referring to FIGS. 3A-3B, the display module 116 generally includes a display 316a, a primary lens 316b, and a lens mount 316c. The display 316a is configured to display graphics to the user. The display 316a may, for example, be a display screen, such as a liquid crystal display (LCD), organic light-emitting diode (OLED) display, or other suitable display. The display 316a may be coupled to a circuit board or other support.

The primary lens 316b is coupled to the display 316a. The primary lens 116b is positioned between the display 116a and the eye of the user and refracts light emitted from the display 316a before reaching the eye of the user. The primary lens 316b may be omitted depending on configurations of the display 316a and/or the removable lens assemblies 120.

The lens mount 316c is configured to couple to and support the removable lens assembly 120 between the display 316a and the eye of the user (i.e., with the primary lens 316b being between the display 316a and the removable lens assembly 120). As shown, the lens mount 316c may additionally couple to and support the primary lens 316b relative to the display 316a, such as by being coupled to the circuit board or other support of the display 316a. The lens mount 316c may surround the primary lens 316b (e.g., forming a bezel or barrel structure of the primary lens 316b).

The removable lens assembly 120 generally includes a lens element 330 and a lens frame 340. The lens frame 340 is coupled to the lens element 330 and is configured to removably couple to the lens mount 316c for supporting the lens element 330 in a predetermined position on to the display module 116 (e.g., relative to the display 316a and/or the primary lens 316b). The lens frame 340 is, for example, coupled to an outer peripheral surface of the lens element 330. Variations of the lens mount 316c and interaction with the lens frame 340 are discussed in further detail below. The removable lens assembly 120 may also be referred to as an interchangeable lens assembly, an interchangeable lens, a removable lens, or a lens.

The lens element 330 may be a corrective lens, for example, to address refractive errors of the eye of the user, such as myopia, hypermetropia, and/or astigmatism. The removable lens assembly 120 and the lens element 330 may be associated with a particular user by having particular lens characteristics to address the particular refractive errors of the eye of the particular user (e.g., eye characteristics). Such lens characteristics and eye characteristics may each include sphere, cylinder, axis, and/or other parameters conventionally used to define eyeglass prescriptions or refractive errors of eyes of one or more users.

The lens characteristics of the lens element 330 and, thereby the removable lens assembly 120, may also include a center (e.g., optical axis) that is to be aligned with a pupil of the user. Therefore, the removable lens assembly 120 may be mounted to the lens mount 316c in a predetermined position (i.e., up/down, left/right, and rotational position) to ensure proper spatial positioning of the lens element 330 relative to the eye of the user.

The lens element 330 may, instead, be a non-corrective lens that protects the primary lens 316b from contact by the user and/or debris, which might otherwise interfere with the user viewing the display 316a (e.g., scratching or obstructing the view). For example, one pair of removable lens assemblies 120 may include lens elements 330 that are corrective for use by a particular user, while another pair of removable lens assemblies 120 may include lens elements 330 that are non-corrective for use by other users (e.g., users not requiring corrective lenses).

Referring to FIGS. 4-6, an outer periphery of the removable lens assembly 120 may have different shapes. As shown in FIG. 4, the removable lens assembly 120 has an outer periphery that is formed by the lens frame 340 and that is ovular (i.e., having curved left and right ends; as shown). The outer periphery may instead be circular (see lens frame 540 of lens assembly 520 in FIG. 5) or may be rectangular (see lens frame 640 of lens assembly 620 in FIG. 6). As discussed in further detail below, those lens assemblies having outer peripheries that are rotationally symmetric (e.g., being ovular, circular, rectangular, or other suitable shape) may be further configured to couple to the lens mount 316c in different rotational positions about the optical axis of the lens element 330 for use with the display module 116. Alternatively, the removable lens assemblies 120 may have outer peripheries that are rotationally asymmetric, such that the lens mount 316c is coupleable in only one position for use with the display module 116.

Referring again to FIG. 3A and FIG. 4, light is emitted by the display 316a and passes through the primary lens 316b and then through the lens element 330 before reaching the eye of the user. For example, light emitted from outer edges 360a of the display 316a may generally follow an outer light path 360 (e.g., a ray trace), whereby the light emitted from the display 316a is refracted by the primary lens 316b and is subsequently refracted by the lens element 330. The outer light path 360 passes through the primary lens 316b generally a passage location 360b. The outer light path 360 enters an entry side 330a of the lens element 330 at entry point 360c and exits an exit side 330b of the light path at an entry point 360c. Moving through the lens element 330 from the entry side 330a to the exit side 330b, the outer light path 360 narrows, so as to focus toward the eye of the user.

Areas of the lens element 330 outside of the entry point 360c and the exit point 360d (i.e., radially outward toward edges of the lens element 330) do not function to refract light toward the eye of the user and may be considered non-functional (e.g., non-refractive). Such non-functional areas of the lens element 330 may be removed and/or blocked by the lens frame 340, thereby permitting different structural configurations of the lens frame 340. As shown in FIG. 4, the functional area of the lens element 330 may, as shown, be smaller than a functional area of the primary lens 316b (e.g., smaller in area, width, and/or height than the functional the passage location 360b on the entry side 330a at the entry point 360c and/or on the exit side 330b at the exit point 360d). The functional area of the lens element 330 may also, as shown, be smaller than the display 316a (e.g., smaller in area, width and/or height than the light emitting of the display 316a on the entry side 330a at the entry point 360c and/or on the exit side 330b at the exit point 360d). The functional area of the primary lens 316b may, as shown, be larger than the display 316a (e.g., larger in area, width, and/or height than a light emitting area of the display 316a). Additionally, the functional areas of the primary lens 316b and the lens element 330 may allow for any eye camera 319 of the head-mounted display unit 110 (e.g., of the display module 116) to observe the eye of the user (e.g., light moving in a direction opposite that emitted by the display 316a).

Still referring to FIGS. 3A-3B, an outer periphery of the lens element 330 is coupled to an inner periphery of the lens frame 340, for example, being engaged thereby and/or adhered thereto. The outer periphery of the lens element 330 and the inner periphery of the lens frame 340 have corresponding shapes allowing coupling therebetween, such as being straight (e.g., having the same cross-sectional shape moving axially) or tapering (e.g., widening moving toward the display module 116). The outer periphery of the lens element 330 may have generally the same size as the primary lens 316b (e.g., having generally the same area, width, and/or height), which defines non-functional area of the lens element 330.

Figure 7:
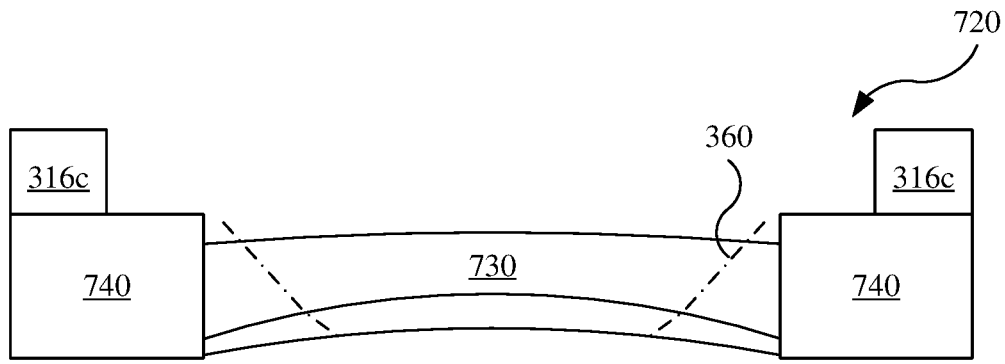
FIG. 7 is a cross-sectional view another embodiment of a removable lens.
Figure 8:
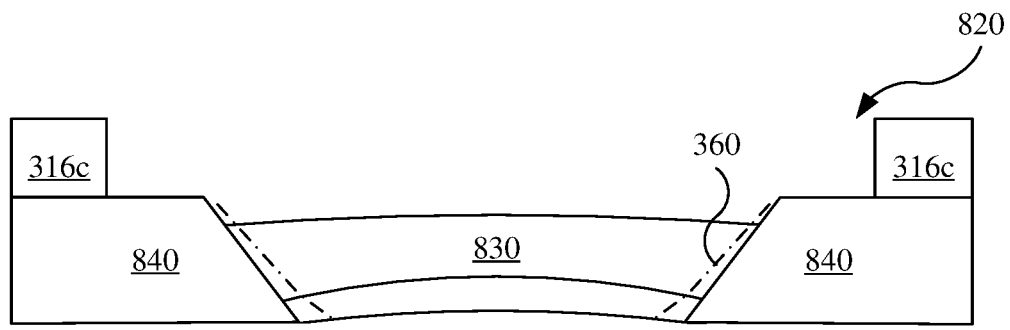
FIG. 8 is a cross-sectional view another embodiment of a removable lens.
Figure 9:
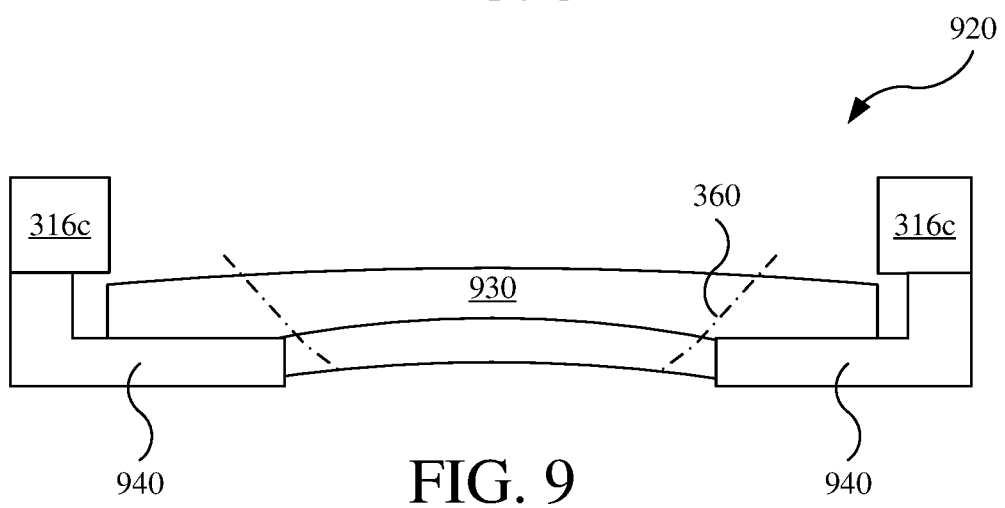
FIG. 9 is a cross-sectional view another embodiment of a removable lens.

Referring to FIGS. 7-9 and as referenced above, the non-functional area of the lens element 330 may be reduced with the lens element 330 being smaller than the primary lens 316b.

As shown in FIG. 7, a removable lens assembly 720 is a variation of the removable lens assembly 120 and generally includes a lens element 730 and a lens frame 740. The lens element 730 is a variation of the lens element 330 differing by being smaller, such as by being smaller than the primary lens 316b (e.g., smaller in area, width, and/or height). The lens frame 740 is a variation of the lens frame 340 differing by extending radially inward further than the lens frame 740, such as by having an inner periphery that is smaller than the primary lens 316b and/or the lens mount 316c (e.g., being smaller in area, width, and/or height).

Referring to FIG. 8, a removable lens assembly 820 is a variation of the removable lens assembly 120 and generally includes a lens element 330 and a lens frame 840. The lens element 830 is a variation of the lens element 830 differing by having edges that are beveled (e.g., tapered) at an angle or curvature that more closely conforms to the angle at which the outer light path 360 (e.g., the angle of refraction) passes through the lens element 830. For example, an outer peripheral surface of the lens element 830 may extend at an angle measured relative to the optical axis of the lens element that is greater than zero, such as between 15 and 75 degrees, such as between 30 and 60 degrees). Edges of the outer peripheral surface on entry and exit sides of the lens element 830 may be smaller than peripheral dimensions of the primary lens 316b (e.g., being smaller in area, width, and/or height). The edge of the peripheral surface on the exit side of the lens element 830 may be smaller than the edge of the peripheral surface on the entry side thereof (e.g., reducing in size moving away from the primary lens 316b and toward the eye of the user). The lens frame 840 is a variation of the lens frame 340 by extending radially inward further than the lens frame 340, such as by having an inner periphery that is smaller than the primary lens 316b on one or both of entry and exit sides of the lens element 830. The lens frame 840 is coupled to the outer peripheral surface of the lens element 830 and may follow or otherwise accommodate the shape of the peripheral surface of the lens element 830 (e.g., having a matching bevel or contour).

Referring to FIG. 9 a removable lens assembly 920 is a variation of the removable lens assembly 120 and generally includes a lens element 930 and a lens frame 940. The lens element 930 is a variation of the lens element 330 differing by having non-functional areas of the exit side (e.g., or other concave side) forming a forward surface, which may be planar, that is coupled to the lens frame 940 and surrounds functional areas of the lens element 930. The lens frame 940 is a variation of the lens frame 340 by being coupled to the forward surface of the exit side 930b of the lens element 930, and protruding inward from the lens mount 316c.

Referring again to FIGS. 3-4, the lens mount 316c and the removable lens assembly 120 are cooperatively configured for the removable lens assembly 120 to removably couple to the lens mount 316c to be supported thereby. As shown, the lens mount 316c and the removable lens assembly 120 include cooperative coupling features 316d, 322, respectively. The cooperative coupling features 316d, 322 are magnetic and may be referred to as magnetic coupling features. The magnetic coupling features 316d, 322 are arranged at corresponding positions of the lens mount 316c and the lens frame 340 of the removable lens assembly 120 for the lens mount 316c to support the removable lens assembly 120 in the one or more predetermined positions (i.e., vertically, laterally, and rotationally) at which the lens element 330 is properly aligned with the eye of the user.

For each pair of the corresponding magnetic coupling features 316d, 322, one may be a permanent magnet, while the other is an attractor element (e.g., an attractor plate made of a ferromagnetic material) or another permanent magnet of suitable orientation. For example, the magnetic coupling features 316d of the lens mount 316c may be attractor plates, while the magnetic coupling features 322 of the removable lens assembly 120 are permanent magnets.

The magnetic coupling features 316d, 322 are provided in suitable size, number, and location for the lens mount 316c to adequately support the removable lens assembly 120 during use, while still allowing the removable lens assembly 120 to be easily removed by the user. For example, as shown, the lens mount 316c and the removable lens assembly 120 may include six pairs of the magnetic coupling features 316d, 322, more or less.

The removable lens assembly 120 and the lens mount 316c may be configured for the removable lens assembly 120 to be mounted to the lens mount 316c in only one predetermined position. For example, the lens element 330 may have an optical axis that is to be positioned off-center relative to the lens mount 316c, thereby requiring the removable lens assembly 120 to be coupled to the lens mount 316c in one predetermined position. If the removable lens assembly 120 were instead coupled the lens mount 316c in another position rotated therefrom, the optical axis would be moved relative to the lens mount 316c and, thereby, relative to the display 316a and the eye of the user, resulting in reduced image quality perceived by the user.

The magnetic coupling features 316d, 322 may be configured to prevent incorrect positioning of the removable lens assembly 120 relative to the lens mount 316c. For example, as shown in FIG. 4 with the magnetic coupling features 322 illustrated in dashed lines in FIG. 4 (e.g., being embedded, hidden, or otherwise coupled to the lens frame 340), the magnetic coupling features 316d, 322 may be positioned and/or distributed asymmetrically to prevent alignment of corresponding pairs of the magnetic coupling features 316d, 322 and, thereby, prevent coupling of the removable lens assembly 120 to the lens mount 316c in another position (e.g., rotated by 180 degrees). Instead or additionally, the magnetic characteristics of the magnetic coupling features 316d, 322 (e.g., orientation and whether being an attractor plate or a permanent magnetic) may prevent magnetic coupling of those magnetic coupling features 316d that do not correspond to each other in another position (e.g., rotated orientation). For example, if the removable lens assembly 120 were rotated by 180 degrees, the magnetic coupling features 316d, 322 that are aligned but do not correspond to each other may not attract each other (e.g., be unattracted, such as with two attractor plates) or may repel each other (e.g., permanent magnets with common poles positioned adjacent each other).

The lens mount 316c and the removable lens assembly 120 may be further configured to mechanically prevent misalignment thereof. For example, the lens mount 316c and the removable lens assembly 120 may further include mechanical engagement features 316e, 324, respectively. The mechanical engagement features 316e, 324 mechanically engage each other to ensure proper positioning and/or alignment between the lens mount 316c and the removable lens assembly 120. The mechanical engagement features 316e, 324 may further engage each other to further prevent relative movement of the removable lens assembly 120 to the lens mount 316c (e.g., in vertical and left-to-right directions relative to the optical axis, while the magnetic coupling features 316d, 322 prevent movement in along the optical axis).

The mechanical engagement features 316e, 324 may, for example, be a recess and a protrusion, respectively, that is received by the recess, or vice versa. If the removable lens assembly 120 were arranged in different position relative to the lens mount 316c, the protrusion would instead engage another surface of the lens mount 316c to prevent mating of the removable lens assembly 120 thereto. Alternatively, the opposed axially-facing (e.g., mating) surfaces of the display module 116 (e.g., the lens mount 316c) and the removable lens assembly 120 (e.g., of the lens frame 340) may have three-dimensional contours that prevent misalignment of the removable lens assemble 120 relative to the lens mount 316c.

Instead of having only one mounting position, the removable lens assembly 120 and the lens mount 316c may be configured for the removable lens assembly 120 to be mounted to the lens mount 316c in more than one position. For example, the lens frame 340 and the lens mount 316c, the coupling features, and/or the mechanical alignment features may be cooperatively configured for the removable lens assembly 120 to couple to the lens mount 316c in two predetermined positions (e.g., by being two-fold rotationally symmetric) or more (e.g., three, or four) and to not couple to the lens mount 316c in other positions.

Referring to FIG. 10A-11B, variations of the removable lens assembly 120 and the lens mount 316c are configured for mechanically coupling the removable lens assembly 120 to the lens mount 316c.

Figure 10A:
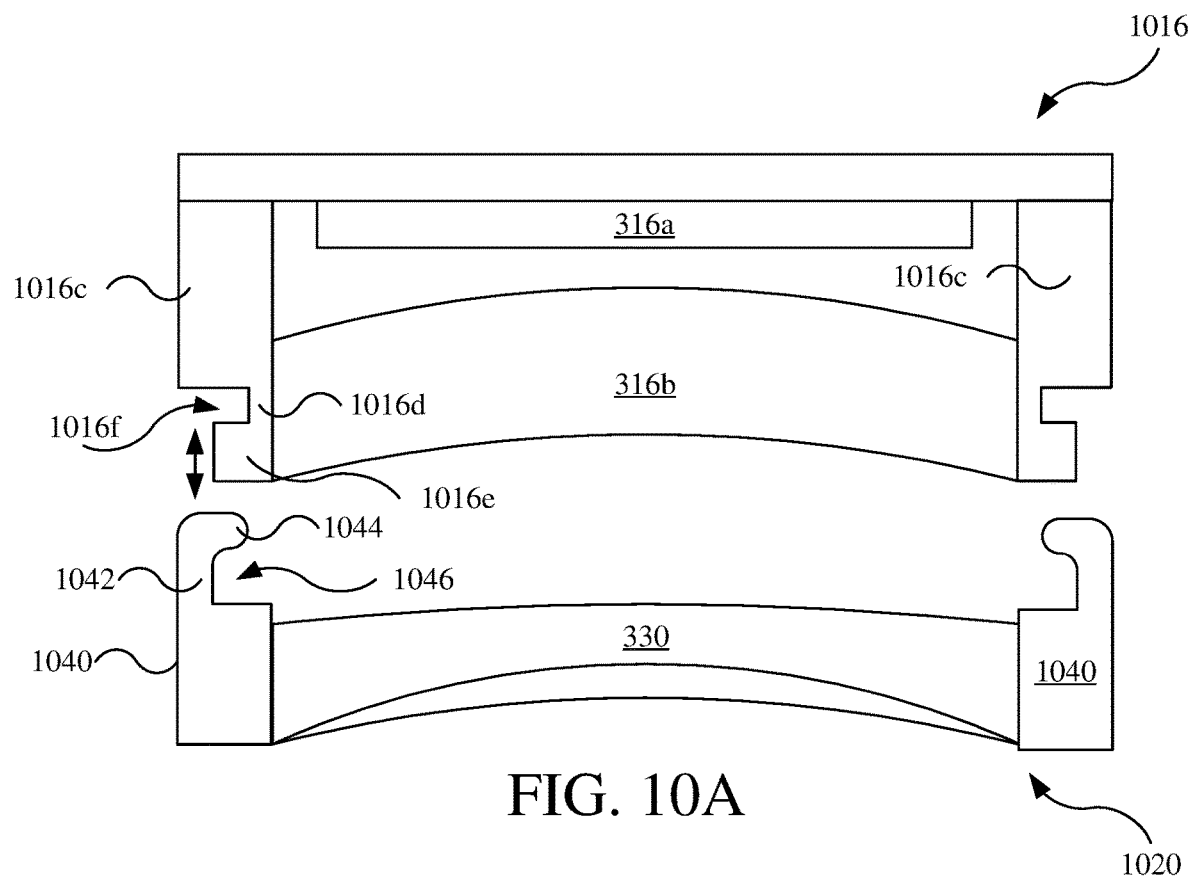
FIG. 10A is a cross-sectional view of another display unit and another interchangeable lens assembly for the display system of FIG. 1 taken along line 10-10 in FIG. 2 shown in a disassembled state.
Figure 10B:
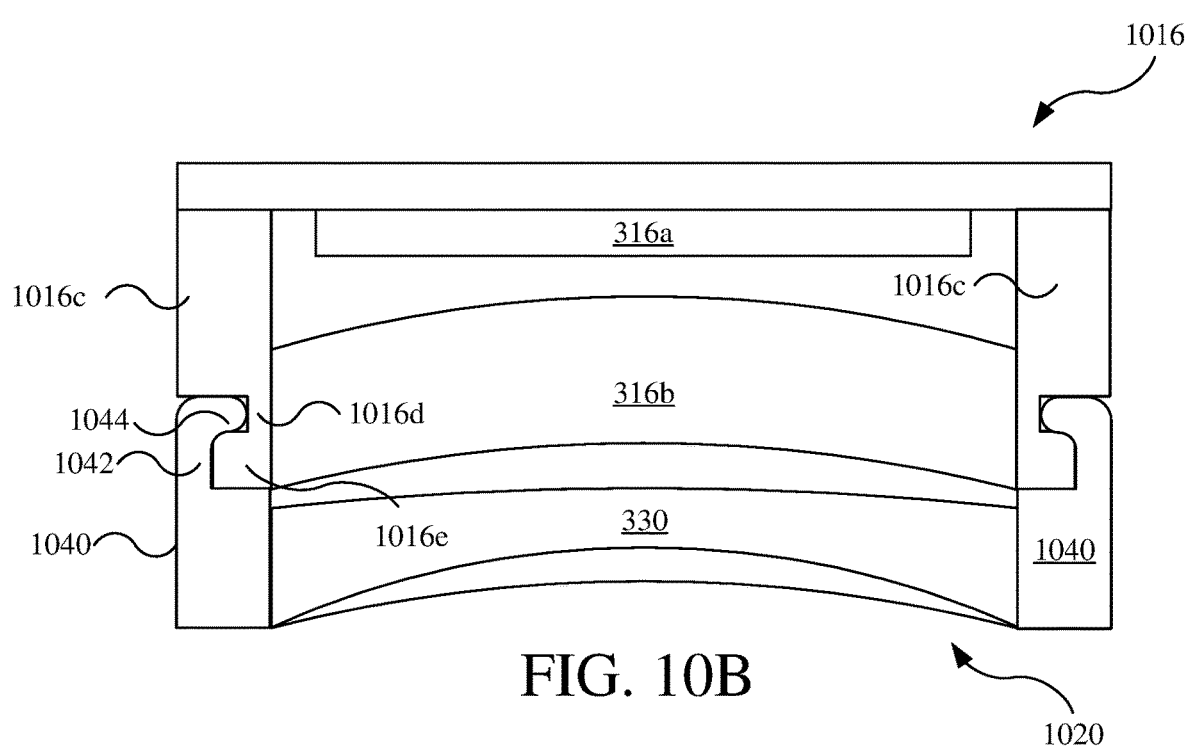
FIG. 10B is a cross-sectional view of the display unit and the interchangeable lens assembly of FIG. 10A shown in an assembled state.

As shown in FIGS. 10A-10B, a display module 1016 includes a lens mount 1016c to which removable lens assembly 1020 is removably coupleable with interfitting structures (e.g., forming an interference fit). The removable lens assembly 1020 includes the lens element 330 and a lens frame 1040, which may be coupled to each other and otherwise configured in the manners described previously (see, e.g., FIGS. 3A-9). The lens frame 1040 includes a barrel 1042 having an annular protrusion 1044 (e.g., a lip or circumferential lip). The barrel 1042 extends axially rearward (e.g., of the lens element 330), while the annular protrusion 1044 protrudes radially inward therefrom. The lens frame 1040 may further define an annular recess 1046 (e.g., a circumferential channel; not labeled) extending radially outward from the annular protrusion 1044 and positioned axially outward thereof (i.e., away from the display 316a). The annular protrusion 1044 and the annular recess 1046 extend circumferentially around the axis of the lens element 330 entirely or substantially entirely (e.g., 80% or more).

The lens mount 1016c includes a barrel 1016d having an annular protrusion 1016e. The barrel 1016d extends axially forward, while the annular protrusion 1016e protrudes radially outward therefrom. The annular protrusion 1016e further defines an annular recess 1016f (e.g., a circumferential channel) positioned axially forward and extending radially inward thereof. The annular protrusion 1016e and the annular recess 1016f defined thereby extend circumferentially around the axis of the lens element 330 entirely or substantially entirely.

The barrel 1042 of the lens frame 1040 is configured to receive the barrel 1016d of the lens mount 1016c therein, so as to removably couple the removable lens assembly 1020 to the lens mount 1016c. The annular protrusion 1044 of the lens frame 1040 is received by and retained in the annular recess 1016f of the lens mount 1016c, while the annular protrusion 1016e of the lens mount 1016c is received by and retained in the annular recess 1046 of the lens frame 1040.

An inner periphery of the annular protrusion 1044 of the lens frame 1040 is smaller than an outer periphery of the annular protrusion 1016e of the lens mount 1016c, such that axial surfaces of the annular protrusions 1044, 1016e overlap each other radially and engage each other axially to prevent unintended decoupling of the removable lens assembly 1020 from the display module 1016. The annular protrusion 1044, as may be the barrel 1042, of the lens frame 1040 is formed of a compliant material, such as rubber or other polymer, that allows the inner periphery of the annular protrusion 1044 to expand and stretch over the annular protrusion 1016e of the lens mount 1016c. The lens frame 1040 being formed of, or otherwise including, the compliant material forming the annular protrusion 1044 may also provide a soft material that may incidentally contact or otherwise engage the face of the user. Alternatively, the barrel 1042 and/or the annular protrusion 1044 may form a flexure. In a still further alternative, the barrel 1042 and the annular protrusion 1044 of the removable lens assembly 1020 are rigid, while the barrel 1016d and/or the annular protrusion 1016e of the display module 1016 are compliant or form a flexure.

While the lens frame 1040 and the lens mount 1016c have been shown and described with the lens mount 1016c (e.g., the barrel 1016d and the annular protrusion 1016e) being received within the lens frame 1040, the lens frame 1040 and the lens mount 1016c may be arranged in an opposite manner with the lens frame 1040 received by the lens mount 1016c.

Figure 11A:
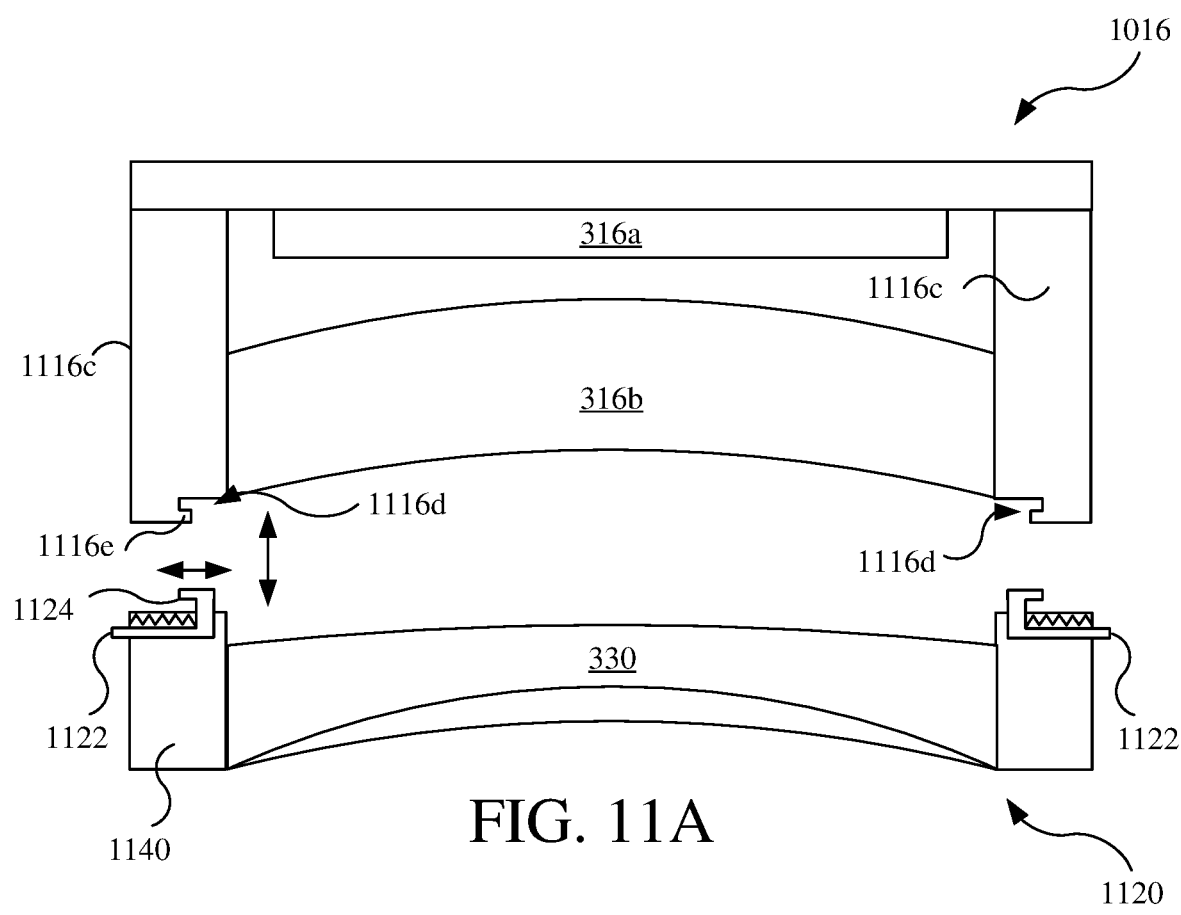
FIG. 11A is a cross-sectional view of another display unit and another interchangeable lens assembly for the display system of FIG. 1 shown in a disassembled state.
Figure 11B:
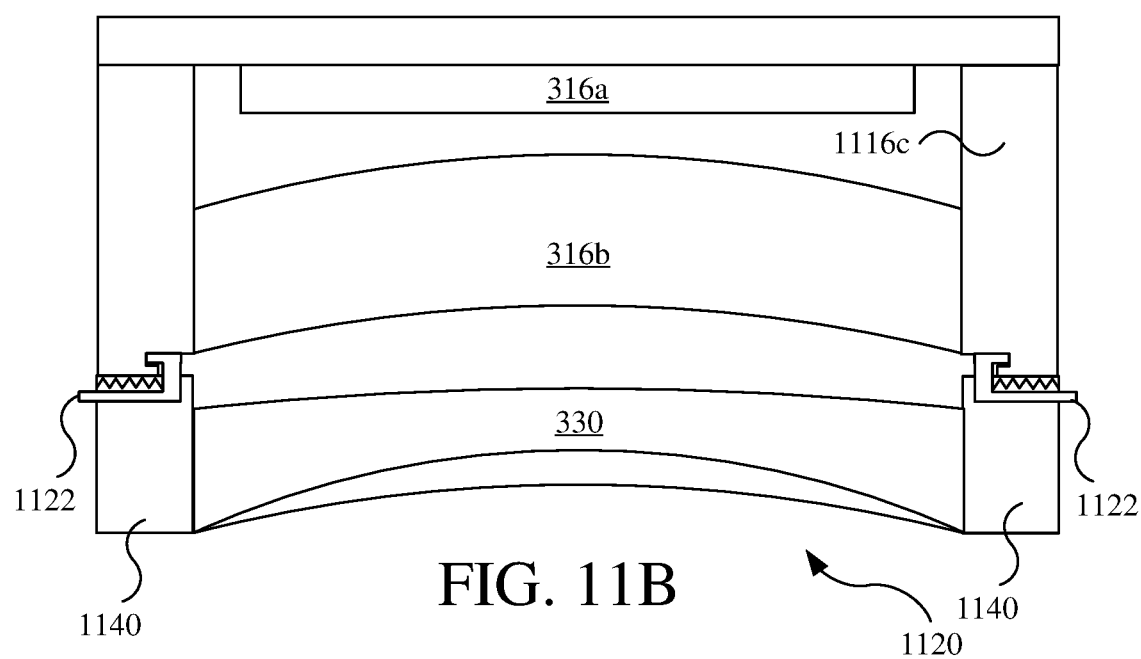
FIG. 11B is a cross-sectional view of the display unit and the interchangeable lens assembly of FIG. 10A shown in an assembled state.

As shown in FIGS. 11A-11B, a display module 1116 includes a lens mount 1116c to which a removable lens assembly 1120 is removably coupled with sprung mechanisms. The removable lens assembly 1120 includes retractable latches 1122 (e.g., latch members) that are normally sprung radially outward for receipt into receptacles 1116d of the lens mount 1116c corresponding thereto. For example, the retractable latches 1122 extend axially rearward from a rear axial surface of a lens frame 1140 and include inner ends 1124 (e.g., hooked or outwardly protruding ends) that extend radially outward therefrom (e.g., hooked ends). When the retractable latches 1122 are retracted (e.g., by a user pressing on exposed ends of the protrusions), the retractable latches 1122 are axially insertable into or removable from the receptacles 1116d in the forward axial surface of the lens mount 1116c corresponding thereto. The inner ends of the retractable latches 1122 are received behind lips 1116e of the receptacles 1116d. Springs (shown schematically; not labeled) bias the retractable latches 1122 radially outward upon release by the user, such that the inner ends of the retractable latches 1122 are arranged behind and engage the lips 1116e of the receptacles 1116d to retain the removable lens assembly 1120 on the lens mount 1116c. While the retractable latches 1122 have been shown and described as being part of the removable lens assembly 1120, retractable latches may instead be provided on the display module 1116 for releasably engaging the removable lens assembly 1120 in a similar manner (e.g., engaging receptacles in an outer peripheral surface of the lens frame 1140.

Figure 12A:
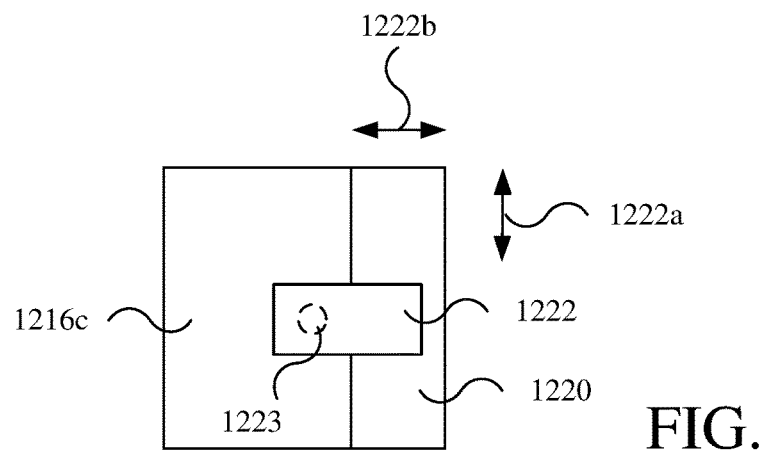
FIG. 12A is a side view of a display module for use in the display system.
Figure 12B:
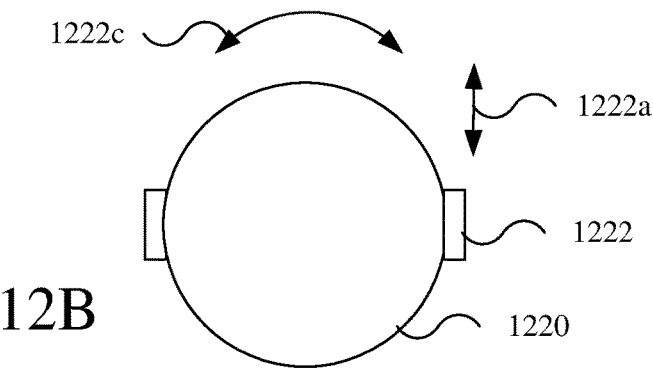
FIG. 12B is a front view of a display module for use in the display system.

Referring to FIGS. 12A-12B, in still further examples, variations of the removable lens assembly 120 may be coupled to the lens mount 1216c in other manners. For example, a removable lens assembly 1220 and the lens mount 1216c may include corresponding mating features 1222, 1223 (e.g., tabs and detents or protrusions) that allow for coupling of the removable lens assembly 1220 to the lens mount 1216c with one or more of an axial motion 1222a, a vertical motion 1222b, or a turning motion 1222c. The axial motion 1222a, the vertical motion 1222b, or the turning motion 1222c (e.g., a quarter turn) cause engagement and coupling of the removable lens assembly 1220 to the lens mount 1216c via the corresponding mating features 1222, 1223.

Figure 12C:
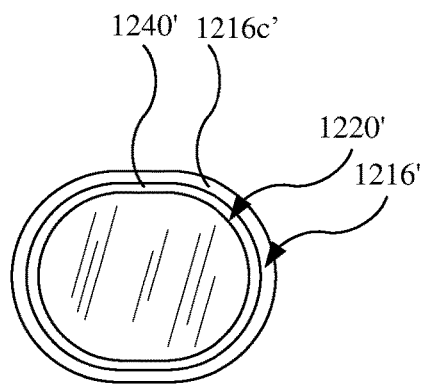
FIG. 12C is a front view of a display module for use in the display system.

Referring additionally to FIG. 12C, a removable lens assembly 1220' is coupled to a display unit 1216' via a friction or interference fit. In particular, the removable lens assembly 1220 includes a lens frame 1240' that is received by a lens mount 1216c' of the display unit 1216', so as to be retained thereby via friction (e.g., with the lens frame 1240' being compressed radially inward by the lens mount 1216c').

Figure 12D:
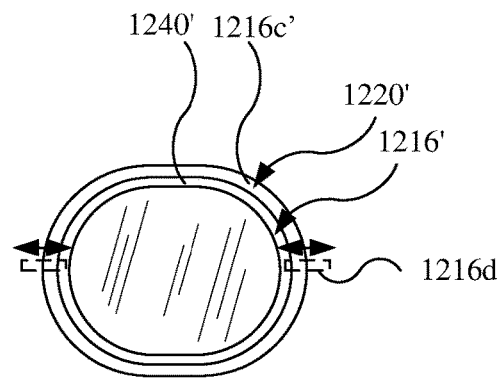
FIG. 12D is a front view of a display module for use in the display system.

Referring additionally to FIG. 12D, the removable lens assembly 1220' is coupled to the display unit 1216' via the retractable pins 1216d. For example, the display unit 1216' includes the lens mount 1216c' that receives the lens frame 1240' of the removable lens assembly 1220' therein and the retractable pins 1216d, which are selectively extended into corresponding recesses of the lens frame 1240'. For example, the pins 1216d may be spring biased radially inward, so as to be received by the lens frame 1240'.

Referring to FIGS. 13A-13F, in a still further example, a removable lens assembly 1320 includes a mechanical coupling feature 1322 (e.g., a male component, or protrusion), which may be referred to as a lens mechanical coupling feature 1322, while a display module 1310 includes a corresponding mechanical coupling feature 1312 (e.g., a female component, recess, or receptacle), which may be referred to as a display mechanical coupling feature 1312. The lens mechanical coupling feature 1322 and the display mechanical coupling feature 1312 mechanically mate with each other to mechanically couple the removable lens assembly 1320 to the display module 1310. For example, as discussed in further detail below, the lens mechanical coupling feature 1322 and the display mechanical coupling feature 1312 may prevent movement of the removable lens assembly 1320 relative to the display module 1310 in directions generally perpendicular to, generally parallel with, and/or about an optical axis of the removable lens assembly 1320.

The removable lens assembly 1320 may further include one or more magnetic coupling features 1324, which may be referred to as lens magnetic coupling features 1324, while the display module 1310 includes one or more corresponding magnetic coupling features 1314, which may be referred to as display magnetic coupling features 1314. The lens magnetic coupling feature 1324 and the display magnetic coupling feature 1314 magnetically couple to each other to magnetically couple the removable lens assembly 1320 to the display module 1310. For example, as discussed in further detail below, the lens magnetic coupling feature 1324 and the display magnetic coupling feature 1314 may prevent movement of the removable lens assembly 1320 relative to the display module 1310 in directions generally parallel with the optical axis of the removable lens assembly 1320.

The lens mechanical coupling feature 1322 of the removable lens assembly 1320 may be arranged on a first side thereof (e.g., left, right, upper, lower, inner, or outer), while the one or more lens magnetic coupling features 1324 may be arranged on a second side thereof, which may be spaced apart from and/or opposite the first side (e.g., right, left, lower, upper, outer, or inner, respectively, such as with the lens element 330 being positioned therebetween). The lens mechanical coupling feature 1322 may be formed by (e.g., be integrally-formed with) a lens frame 340, while the one or more lens magnetic coupling features 1324 are coupled to the lens frame 340. The lens magnetic coupling features 1324 may be or include one or more permanent magnets and/or an attractor material (e.g., ferromagnetic material or component).

The display module 1310 includes a lens mount 1311 having the lens mechanical coupling feature 1322 and the one or more lens magnetic coupling features 1324. As discussed in further detail below, the display mechanical coupling feature 1312 of the lens mount 1311 is configured to receive the lens mechanical coupling feature 1322 therein. The one or more display magnetic coupling features 1314 of the lens mount 1311 magnetically couple to the lens magnetic coupling features 1324 (e.g., being a permanent magnet of opposite polarity or being an attractor material).

As referenced above, the lens mechanical coupling feature 1322 of the removable lens assembly 1320 and the display mechanical coupling feature 1312 of the display module 1310 are configured to mate with each other and, in particular, with the lens mechanical coupling feature 1322 being received by the display mechanical coupling feature 1312. When received thereby, the lens mechanical coupling feature 1322 engages the display mechanical coupling feature 1312 to prevent relative movement therebetween. For example, the lens mechanical coupling feature 1322 engages the display mechanical coupling feature 1312 to prevent relative shearing movement between the removable lens assembly 1320 and the display module 1310, such as upward movement, lateral movement (e.g., in a direction generally perpendicular to an optical axis of the removable lens assembly 1320), and/or rotational movement of the removable lens assembly 1320 relative to the display module 1310 (e.g., generally about the optical axis of the removable lens assembly 1320).

To prevent relative upward movement, an upwardly-facing surface of the lens mechanical coupling feature 1322 engages a downwardly facing surface of the display mechanical coupling feature 1312. To prevent relative downward movement, a downwardly-facing surface of the lens mechanical coupling feature 1322 engages an upwardly-facing surface of the display mechanical coupling feature 1312. For example, upper and lower ends of the lens mechanical coupling feature 1322 engaging respective upper and lower ends of the display mechanical coupling feature 1312 (see FIGS. 13A and 13B). Alternatively, upward- and downward-facing surfaces at intermediate heights of the lens mechanical coupling feature 1322 and the display mechanical coupling feature 1312 engage each other to prevent upward and downward relative movement.

To prevent relative lateral outward movement (e.g., away from the nose 20 of the user), a laterally outward-facing surface of the lens mechanical coupling feature 1322 engages a laterally inwardly-facing surface of the display mechanical coupling feature 1312 (e.g., a leftward facing surface and a rightward facing surface, respectively, for a left removable lens assembly 1320). To prevent relative lateral inward movement (e.g., toward the nose 20 of the user), a laterally inward-facing surface of the lens mechanical coupling feature 1322 engages a laterally outward-facing surface of the display mechanical coupling feature 1312 (e.g., a rightward facing surface and a leftward facing surface, respectively, for a left removable lens assembly 1320), as is shown in FIG. 13F. For example, as is illustrated, the lens mechanical coupling feature 1322 and the display mechanical coupling feature 1312 have curved shapes with outward and inward sides of the lens mechanical coupling feature 1322 (e.g., concave and convex surfaces) engaging respective outward and inward sides of the display mechanical coupling feature 1312 (e.g., convex and concave surfaces, respectively).

To prevent relative rotational movement, the lens mechanical coupling feature 1322, in spaced apart locations on opposite sides thereof (e.g., two on each side), engages the display mechanical coupling feature 1312 on opposite sides thereof. For example, as a clockwise torque is applied to the removable lens assembly 1320, upper inner surfaces and lower outer surfaces of the lens mechanical coupling feature 1322 and the display mechanical coupling feature 1312 engage each other to constrain (e.g., prevent) relative clockwise rotation therebetween. As a counterclockwise torque is applied to the removable lens assembly 1320, upper outer surface and lower inner surfaces of the lens mechanical coupling feature 1322 and the display mechanical coupling feature 1312 engage each other to constrain (e.g., prevent) relative counterclockwise rotation therebetween.

The lens mechanical coupling feature 1322 and the display mechanical coupling feature 1312 may additionally be configured to prevent normal movement (e.g., in the general direction of the optical axis) away from the display module 1310. For example, the display mechanical coupling feature 1312 may include a forward-facing surface (e.g., an undercut or toe-in feature) that engages a rearward facing surface of the lens mechanical coupling feature 1322.

Figure 13A:
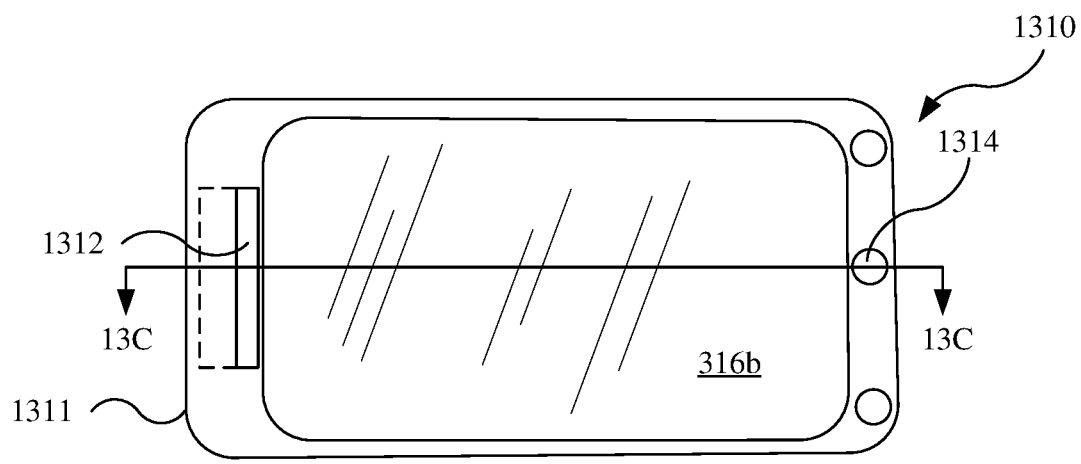
FIG. 13A is a front view of a display module for use in the display system.
Figure 13B:
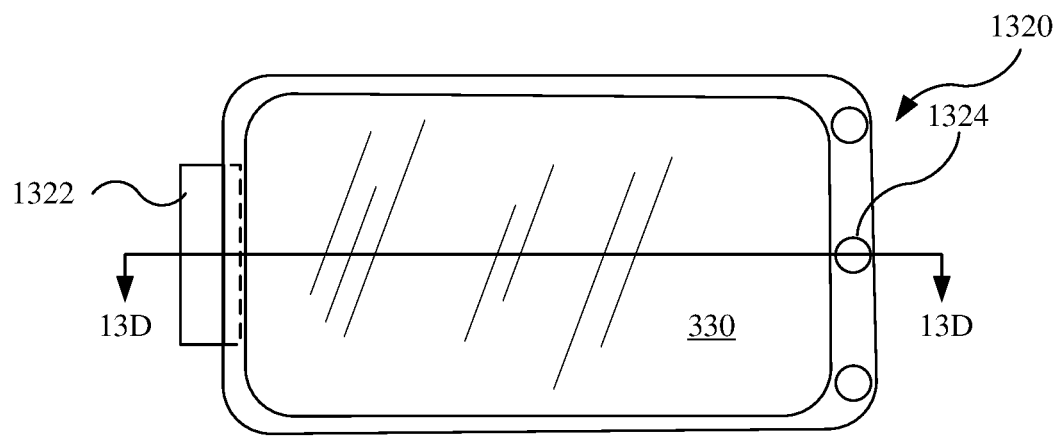
FIG. 13B is a front view of a removable lens assembly for use with the display module of FIG. 13A.
Figure 13C:
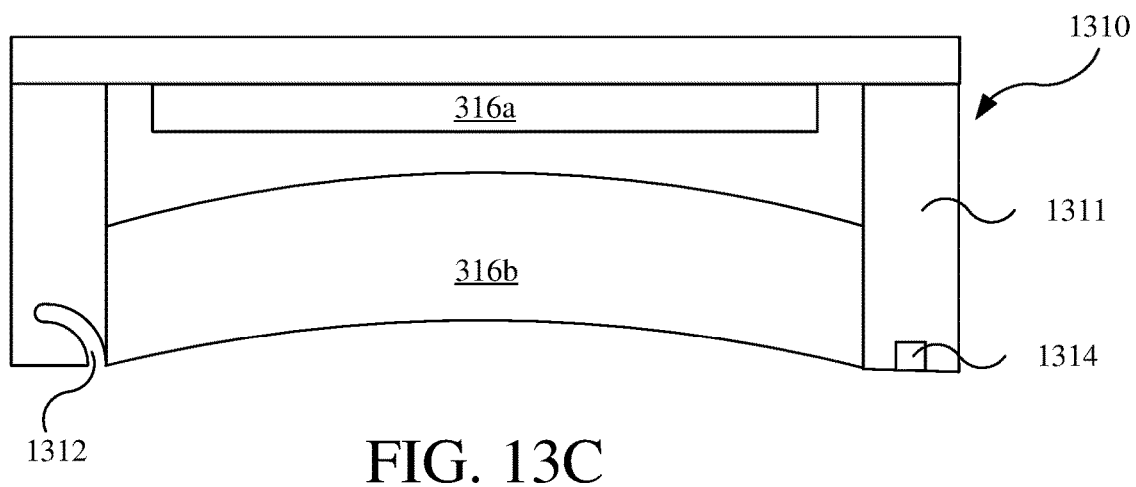
FIG. 13C is a cross-sectional view of the display module of FIG. 13A taken along line 13C-13C.
Figure 13D:
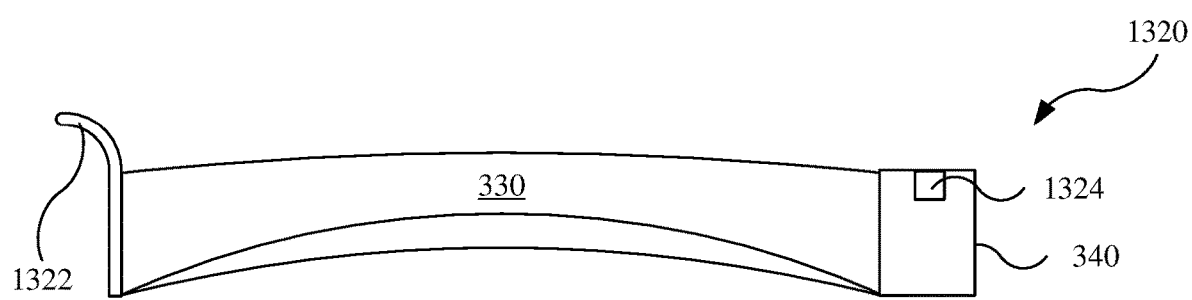
FIG. 13D is a cross-sectional view of the removable lens assembly of FIG. 13B taken along line 13D-13D.
Figure 13E:
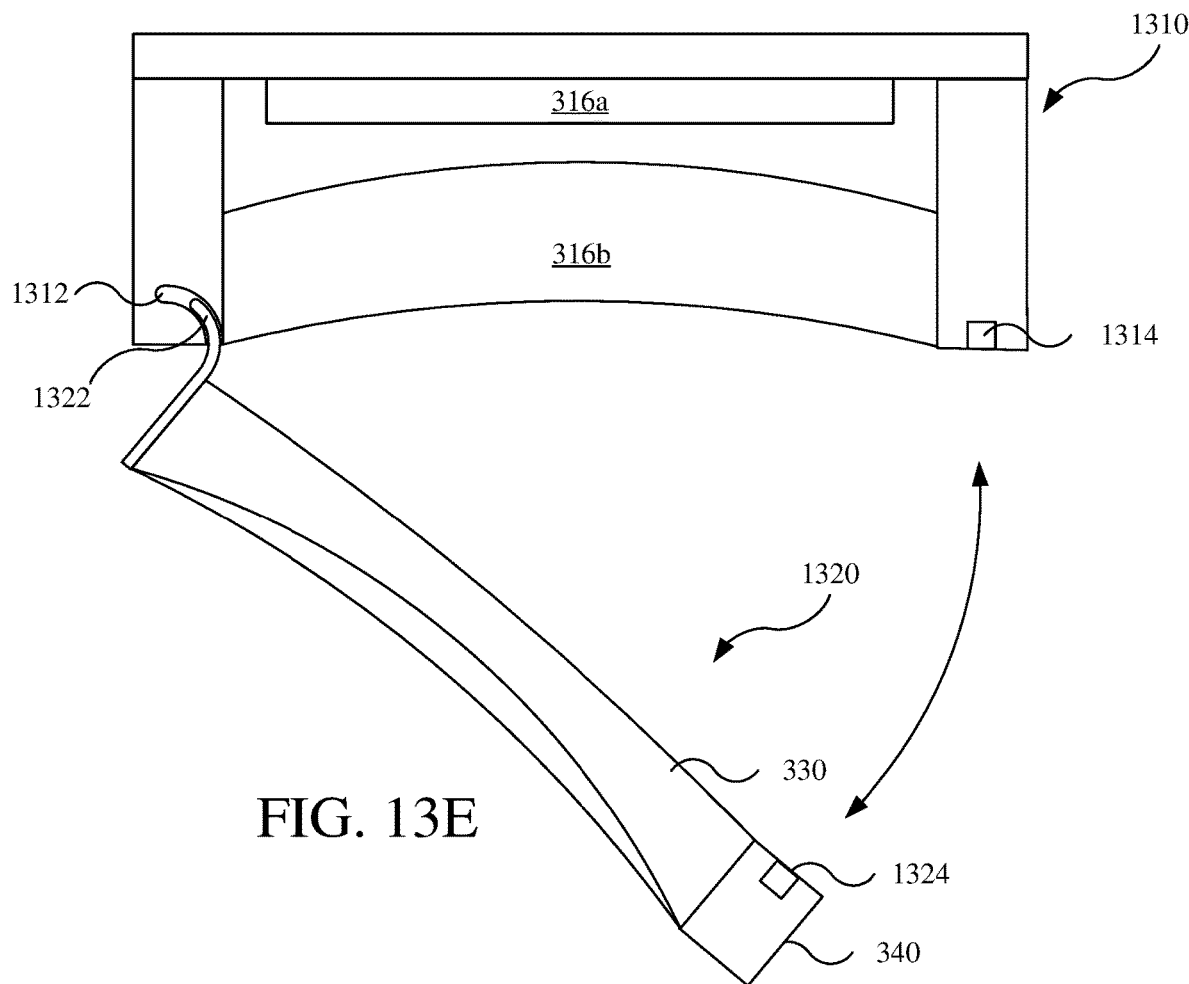
FIG. 13E is a cross-sectional view of the display module of FIG. 13A and the removable lens assembly of FIG. 13B in a partially coupled state.
Figure 13F:
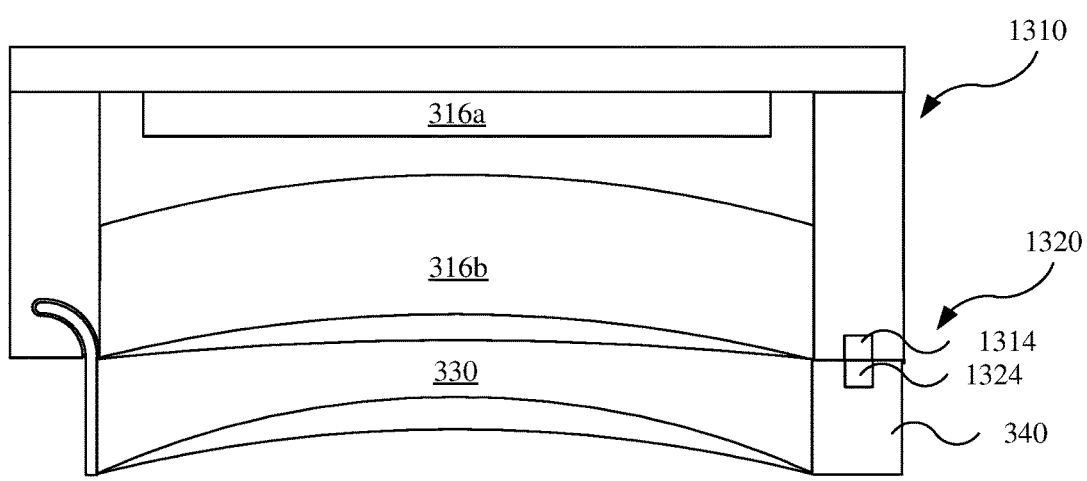
FIG. 13F is a cross-sectional view of the display module of FIG. 13A and the removable lens assembly of FIG. 13B in a coupled state.

Referring to FIG. 13E, to couple the removable lens assembly 1320 to the display module 1310, the lens mechanical coupling feature 1322 is first inserted into the display mechanical coupling feature 1312, and the removable lens assembly 1320 is rotated to bring the magnetic coupling features 1324, 1314 closer to each other to magnetically couple, as discussed in further detail below.

As referenced above, the lens magnetic coupling features 1324 of the removable lens assembly 1320 and the display magnetic coupling features 1314 of the display module 1310 couple to each other magnetically. The lens magnetic coupling features 1324 and the display magnetic coupling features 1314 are arranged at corresponding positions and with corresponding magnetic properties (e.g., being opposite polarity, or one being a ferromagnetic material and the other a permanent magnetic). The lens magnetic coupling features 1324 and the display magnetic coupling features 1314 couple to each other magnetically with force therebetween applied generally in the direction of the optical axis. The lens magnetic coupling features 1324 and the display magnetic coupling features 1314 are also spaced apart from the pivot axis defined by the display mechanical coupling feature 1312, such that the magnetic coupling for therebetween prevent rotation about the pivot axis defined the display mechanical coupling feature 1312. For example, as shown, the lens magnetic coupling features 1324 and the display magnetic coupling features 1314 are positioned generally opposite the lens mechanical coupling feature 1322 and the display mechanical coupling feature 1312, respectively.

Variations of the removable lens assembly 1320 and the display module 1310 are contemplated. For example, the lens mechanical coupling feature 1322 and the display mechanical coupling feature 1312 may have different shapes (e.g., being straight), may be provided in different numbers (e.g., two or more sets thereof, such as pins and apertures, at spaced apart locations to prevent movement as described above), and/or may be provided at different locations (e.g., at upper, lower, or inner sides thereof). Furthermore, the display mechanical coupling feature 1312 may be provided by a different part of the head-mounted display unit 110, such as to the housing 112 (e.g., a curtain or other structure surrounding the display module 1310). Further, instead of the magnetic coupling features 1324, 1314, the removable lens assembly 1320 and the display module 1310 may instead or additionally include mechanical coupling features (e.g., interfitting structures or latches as described above).

It should be noted that, for each of the manners for coupling described above with respect to FIGS. 3A-3B and 10A-13F, the lens mount may be coupled to another portion of the head-mounted display unit 110, such as the housing 112 (e.g., chassis), as opposed to the display module 116 or variations thereof.

Referring to FIGS. 14A-16, the display system 100 and the removable lens assemblies 120 are cooperatively configured for the display system 100 to detect the removable lens assembly 120 coupled to the head-mounted display unit 110. For example, the head-mounted display unit 110 includes one or more lens detection sensors 1418a for detecting the one or more removable lens assemblies 120 coupled thereto. In detecting the removable lens assembly 120, the display system 100 may determine whether or not any of the removable lens assemblies 120 is coupled to the display module 116 (e.g., using a proximity sensor, image recognition, and/or mechanical switch), whether the removable lens assembly 120 is properly coupled (e.g., using a proximity sensor, image recognition, or hall sensors with magnets coupled to the removable lens assembly 120), and/or other information about the removable lens assembly 120 (e.g., corrective or not, serial or model number, associated user, and/or lens characteristics using other types of lens detection sensors 1418a discussed below) to support other functionality. The display system 100 may provide an indication of whether or not the removable lens assembly 120 is coupled to the display module 116, whether the removable lens assembly 120 is properly position relative to the display module 116, and/or other indications (e.g., of the lens configuration and/or lens compatibility as discussed below).

Each removable lens assembly 120 may further include a lens tag 1428 that is in communication with or otherwise readable by the one or more lens detection sensors 1418a. According to detection of the removable lens assembly 120, the display system 100 may perform one or more subsequent operations, which may include changing output of the display module 116, providing an indicator of the removable lens assembly 120, and/or providing an indicator of compatibility of the removable lens assembly 120 with a user. The display system also includes a controller 1450 that controls operation of the head-mounted display unit 110, for example, to detect the removable lens assemblies 120 coupled thereto and/or perform subsequent operations in response thereto. The controller 1450 may be wholly or partially physically incorporated into the head-mounted display unit 110 (as indicated by dash-lines) or may be wholly or partially provided physically separate therefrom (e.g., in an external computing device). An example hardware configuration for the controller 1450 is discussed below with reference to FIG. 14.

In detecting the removable lens assembly 120, the display system 100 may identify or determine information about the removable lens assembly 120, which may be referred to as lens information. The lens information may include an identifier and/or technical characteristics of the removable lens assembly 120. The identifier may be of the removable lens assembly 120 itself (e.g., a serial number or a model number; referred to as a lens identifier), a user associated with the lens (e.g., a user name or user ID; referred to as an associated user identifier), and/or other identifying information (e.g., manufacturer, date; referred to as manufacturing information). The technical characteristics may include refractive characteristics, such as sphere, cylinder, and/or axis parameters and/or an optical axis location of the removable lens assembly 120, which may be referred to as lens characteristics, lens characteristic information, or prescription information. The lens information determined by the display system 100 may then be used by the display system 100 to perform the subsequent operations referenced above and described in further detail below.

The display system 100 may determine the lens information of the removable lens assembly 120 actively coupled (e.g., being coupled or currently coupled) to the head-mounted display unit 110 in various different manners and with different devices. The display system 100 may determine the lens information from the removable lens assembly 120, such as with the lens detection sensor 1418a from the lens tag 1428. In a first example, the lens tag 1428 is an electronic device that stores or otherwise electrically provides the lens information. For example, the lens tag 1428 each removable lens assembly 120 may be an electrically-erasable programmable read-only memory device (EEPROM), a radio frequency identification device (RFID), or an internal resistance device (e.g., an electrical resistance or resistor). The lens detection sensor 1418a is a corresponding electrical device or system configured to receive and/or otherwise receive the lens information from the lens tag 1428, such as by being in wireless or physical communication with the EEPROM, to read a signal of the RFID, and/or to measure or otherwise determine a resistance signature of the resistance device.

In a second example, the lens tag 1428 has a magnetic signature. The removable lens assembly 120 includes various magnets (e.g., the magnetic coupling features 322) or other magnets, which may provide a magnetic signature by having varied strength and/or position and which are detected by the lens detection sensor 1418 a, which may include one or more hall sensors or other magnetic sensors that sense the magnetic field of the magnets. The combination of magnetic fields detected by the lens detection sensor 1418 a provide the lens information (e.g., a lens identifier of a particular magnetic signature). Hall sensors may instead or additionally be used to determine whether the removable lens assembly 120 is properly coupled to the lens mount 316 c.

In a third example, the lens tag 1428 is an optical marking that displays or otherwise communicates the lens information. For example, the lens tag 1428 may be an optical or infrared (IR) marking on the removable lens assembly 120, such as a quick response code (QR Code), a bar code, or alphanumeric characters. The lens detection sensor 1418a of the head-mounted display unit 110 is a corresponding optical reading device, such as a camera or a combined illuminator/sensor device (e.g., a QR Code scanner), which may be the eye camera 319 that also observes the eye as described previously. In one particular example, the lens tag 1428 is an infrared bar code.

The display system 100 may determine the lens information required for one or more further operations directly from the removable lens assembly 120 itself. Instead or additionally, the display system 100 may determine additional lens information from other sources for performing subsequent operations. For example, the display system 100 may receive only initial lens information (e.g., the lens identifier or the associated user identifier) from the removable lens assembly 120, while other lens information (e.g., the associated user identifier and/or lens characteristics) are stored in association therewith by the display system 100 (e.g., by a storage of the controller 1450). Thus, by determining initial lens information from the removable lens assembly 120, the display system 100 may determine (e.g., retrieve) other lens information to support subsequent operations.

The lens information of the removable lens assembly 120 coupled to the display module 116 may be used to control various functionality of the display system 100, which may include operating the display 316a, providing an indication to the user of the removable lens assemblies 120 coupled thereto, and/or determining compatibility of the removable lens assemblies 120 with the user. Operation of the display 316a may be performed according to the lens information of the removable lens assembly 120 coupled to the display module 116, such that operation of the display 316a may differ between one of the removable lens assemblies 120 having one set of lens characteristics and another of the removable lens assemblies 120 having another set of lens characteristics (e.g., different brightness and/or pixel output to account for different characteristics of the optical system formed by the primary lens 316b and the lens elements 330 or different lens characteristics).

Instead or additionally, the lens information of the removable lens assembly 120 coupled to the display module 116 may be used to provide an indication to the user or potential users of the removable lens assembly 120 coupled thereto, which may be referred to as a lens configuration indication. The lens configuration indication differs for different ones of the removable lens assemblies 120, for example, those removable lens assemblies 120 associated with different users. A first lens configuration indication is provided for one of the removable lens assemblies 120 (or one pair of the removable lens assemblies 120 associated with each other), while a second, different lens configuration indication is provided another of the removable lens assemblies 120 (or another pair of the removable lens assemblies 120 associated with each other). The display indication (e.g., or output instruction) may be stored in association with the lens information (e.g., the lens identifier, associated user identifier, or lens characteristics), for example, by the display system 100 and retrieved upon determining the lens identifier. The configuration indication may be provided irrespective of the user (e.g., without detecting or identifying the user).

The lens configuration indication may be provided as, for example, an external light indicator, a display indicator, or an audible indictor. The external light indicator is provided with an external visual indicator 1418b (e.g., a light-emitting diode) of the head-mounted display unit 110, which is visible by potential users prior to wearing the head-mounted display unit 110 and may differ, for example, by color (e.g., red vs. blue to differentiate between first and second users).

The display indicator is provided by the display 316a and is viewable by the user or potential users through the removable lens assembly 120. The display indicator may for example, be a color, symbol, or set of characters that differs for different users and is identifiable even for potential users having low acuity with the removable lens assembly 120 (e.g., for which the display 316a may appear blurry). The audible indicator is provided by an audio output device 1418c of or associated with the head-mounted display unit 110 (e.g., a speaker or headphones) and may be audible to potential users prior to or after wearing the head-mounted display unit 110. The audible indicator may, for example, be spoken words (e.g., identifying the user associated with the removable lens assembly 120) or tones that for different users associated with the removable lens assemblies 120.

Figure 14A:
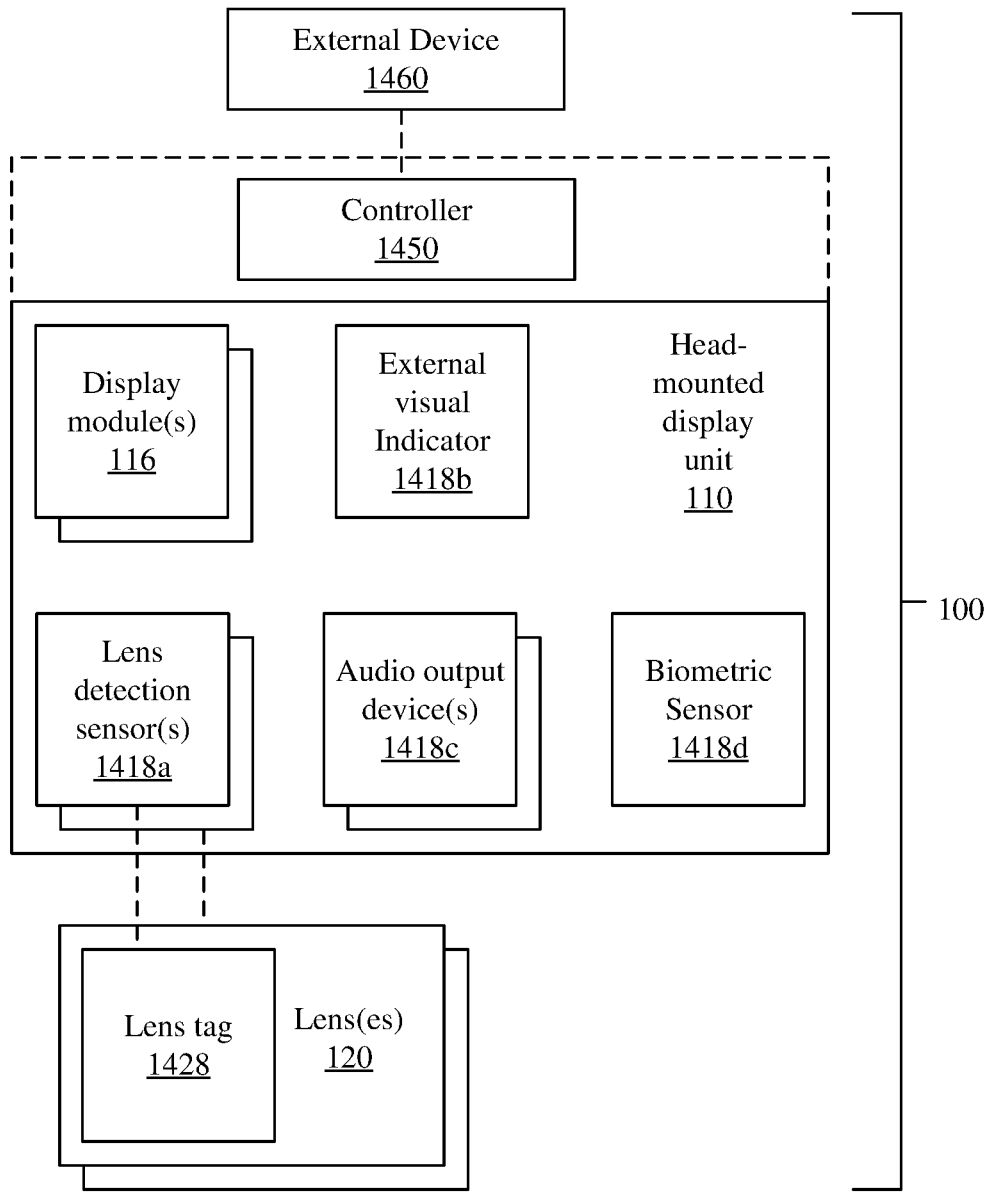
FIG. 14A is a schematic view of a display system.
Figure 14B:
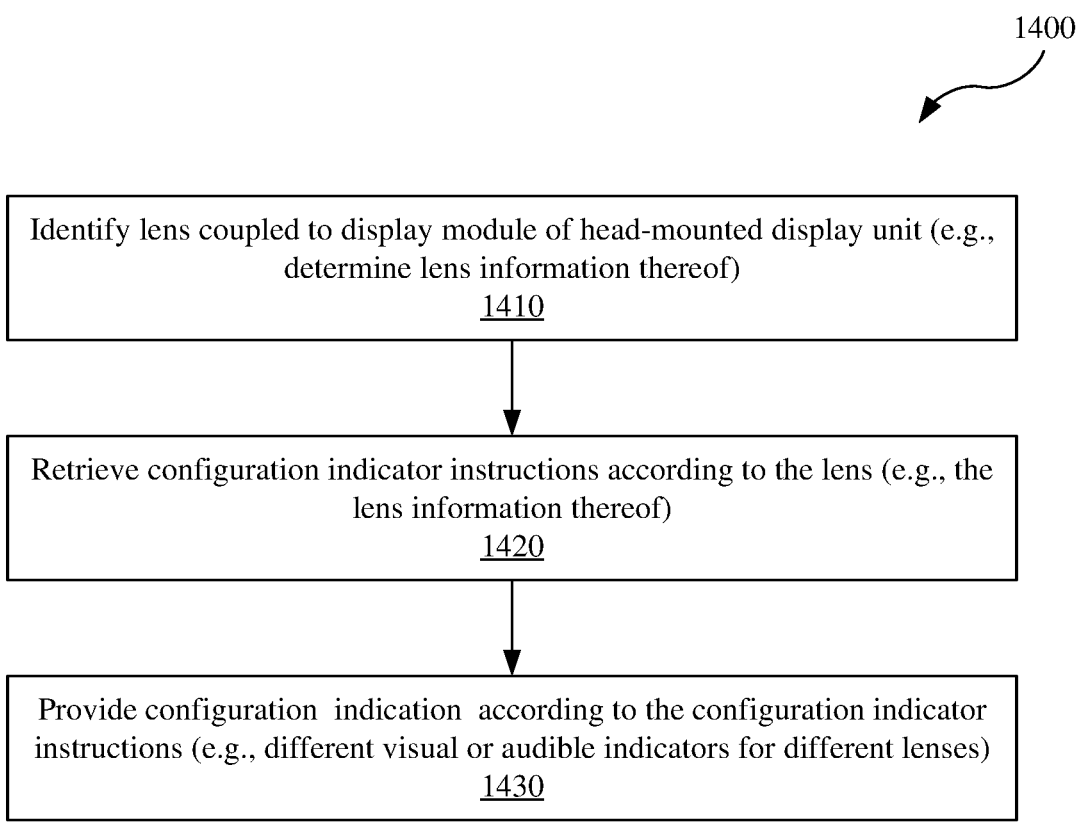
FIG. 14B is a flow chart of a method for operating the display system.

Referring to FIGS. 14A and 14B, a method 1400 is provided for indicating a lens configuration, which generally includes a first operation 1410 of identifying a removable lens assembly 120 coupled to a display module 116, a second operation 1420 of retrieving a configuration indicator instruction, and a third operation 1430 of providing a configuration indication according to the instruction. The first operation 1410 of identifying the interchangeable lens assembly is performed with the lens detection sensor 1418a and the controller 1450 determining lens information from the lens tag 1428 of the one or more removable lens assembly 120 coupled to the one or more display modules 116 of the head-mounted display unit 110. The second operation 1420 of retrieving a configuration indication instruction is performed, for example, by the controller 1450 retrieving from a storage the instruction associated with the lens information. The third operation 1430 of providing the configuration indication is provided, for example, by the display module 116, the external visual indicator 1418b, and/or the audio output device 1418c, as operated by the controller 1450.

Referring to FIGS. 14A-16, instead or additionally, the display system 100 may use the lens information of the removable lens assembly 120 coupled thereto to determine compatibility with the user and accordingly provide a compatibility indicator to the user (e.g., only of incompatibility is determined). The display system 100, in addition to determining the lens information of the removable lens assembly 120 coupled to the head-mounted display unit 110, identifies the current user, and compares user information with the lens information to determine compatibility.

The display system 100 may identify the user in various manners, for example, with biometric sensing, receipt of user credentials, and/or authentication by another device. To identify the user via biometrics, the display system 100 may include a biometric sensor 1418d to identify the user with biometrics (e.g., facial recognition, fingerprint recognition, voice recognition, iris recognition, and/or recognition of other biometric parameters, such as ear geometry, bone conduction or density characteristics, forehead features, or skin). The biometric sensor 1418d is, for example, coupled physically coupled to the head-mounted display unit. For example, in the case of identifying the user with iris detection, the biometric sensor 1418d may be the eye camera 319 described previously and which may be the same sensor for identifying the removable lens assembly 120. To identify the user via user credentials, the display system 100 receives user credentials (e.g., a username and password) from an input device of or associated with the display system 100 (e.g., a microphone of the head-mounted display unit, or an external device 1460 in communication with the controller 1450 or the head-mounted display unit 110). To identify the user by authentication from another device, the external device 1460 may authenticate the user (e.g., via biometrics or credentials) and communicate such authentication to the controller 1450. The external device 1460 may be considered part of the display system 100 but may function independent thereof (e.g., a smartphone).

The display system 100 stores or otherwise receives user information. The user information may include a user identifier (e.g., a username or user number) stored in association with an associated lens identifier (e.g., a serial number or model number of one or more of the removable lens assemblies 120 associated with the user) and/or eye characteristic information (e.g., sphere, cylinder, and/or axis parameters; referred to herein as eye characteristics).

The display system 100 may receive the user information during an initializing process in which the user information is associated with the lens information. During the initializing process, the user information may be input by the user or received from another source (e.g., the external device 1460). The lens information may be obtained from the removable lens assemblies 120 when coupled to the display module 116 as described above (e.g., electronically and/or optically), or be input by the user (e.g., inputting the serial or model number of the removable lens assembly 120) or received from another source (e.g., the external device 1460).

Figure 15:
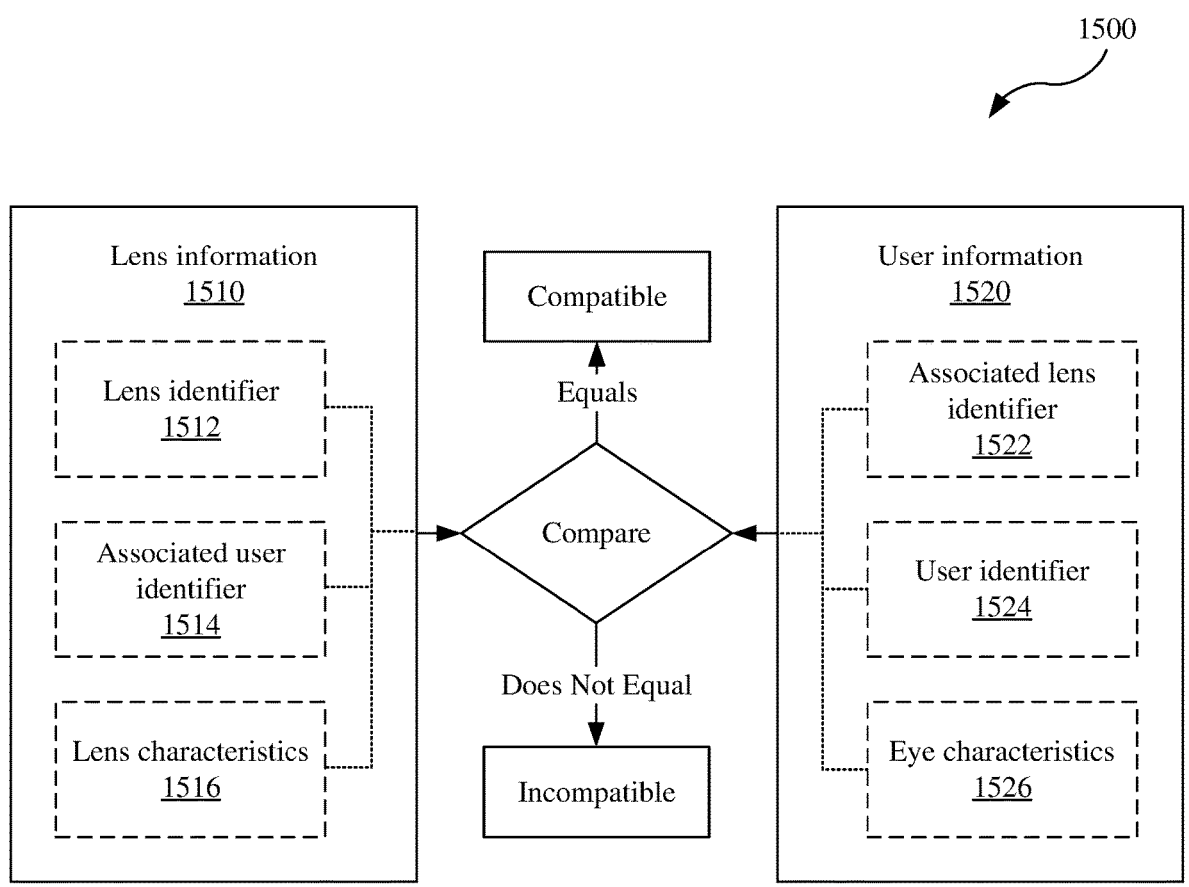
FIG. 15 is a flow chart of a process for determining compatibility of a removable lens and a user.

Referring to FIG. 15, to determine compatibility, the display system 100 compares the lens information 1510 to the user information 1520, for example, using a compatibility determiner 1500. For example, or more of: (a) the lens information 1510 of the lens identifier 1512 is compared to the user information 1520 of the associated lens identifier 1522, (b) the lens information 1510 of the associated user identifier 1514 is compared to the user information 1520 of the user identifier 1524), or (c) the lens information 1510 of the lens characteristics 1516 is compared to the user information 1520 of the eye characteristics 1526. The display system 100 determines the one or more removable lens assemblies 120 to be compatible if the lens information matches (e.g., equals) the user information, or incompatible if not matching.

If determined compatible, the compatibility indication may provide a positive indication (e.g., that the removable lens assembly 120 is compatible with the user) or be omitted (e.g., proceeding to normal operation). If determined incompatible, the compatibility indication is negative (e.g., indicating that the removable lens assembly 120 is not compatibility with the user). Such a negative indication may, for example, include an icon that graphically indicates incompatibility, textual instructions or information, and/or audible instructions or information.

Figure 16:
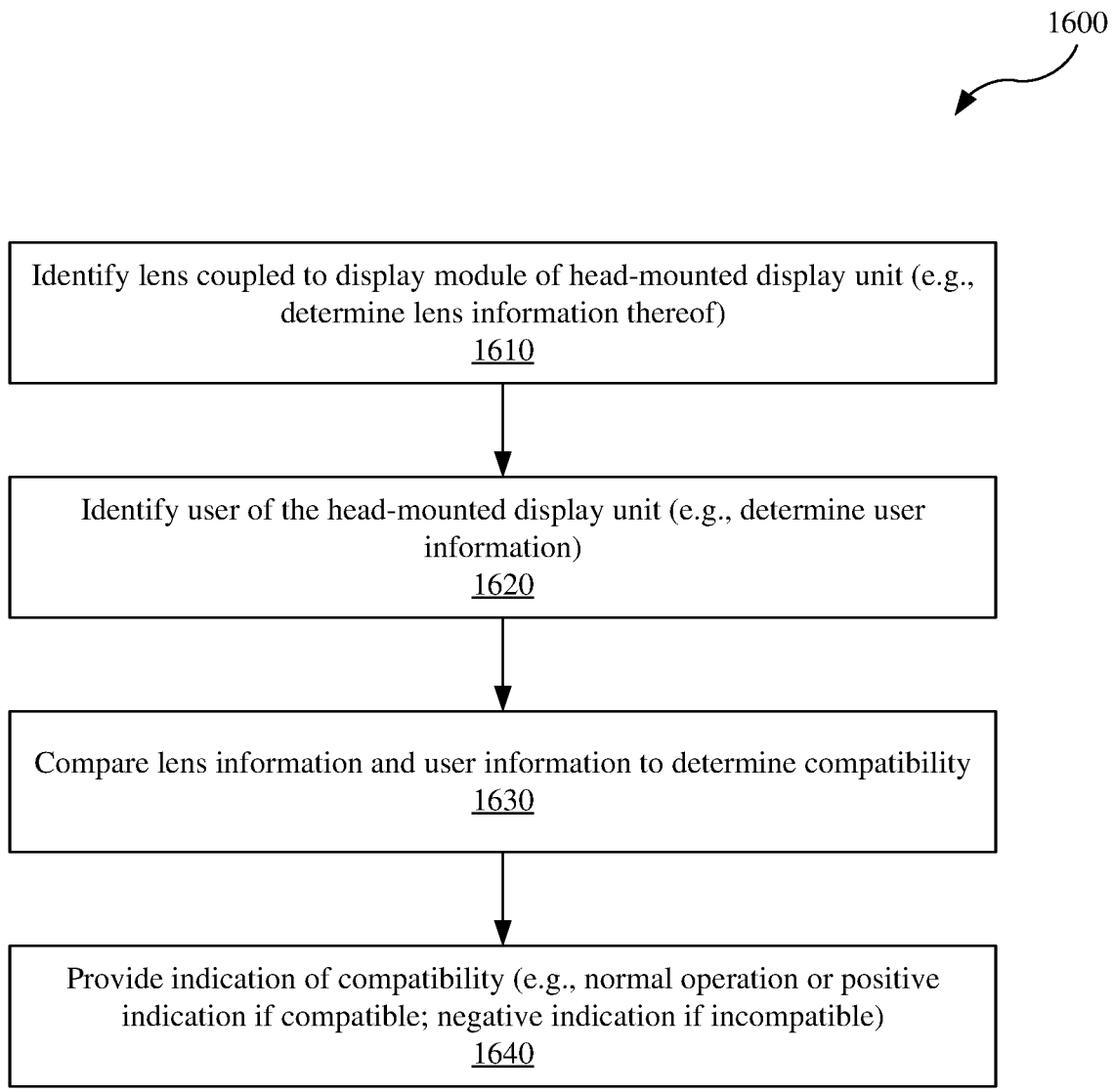
FIG. 16 is a flow chart of a method for determining compatibility of the removable lens and the user.

Referring to FIG. 16, a method 1600 is provided for operating the display system 100 to determine and indicate compatibility of the removable lens assembly 120 with the user. The method includes a first operation 1610 of identifying the one or more removable lens assemblies 120 coupled to the one or more display modules 116, a second operation 1620 of identifying the user, a third operation 1630 of comparing the lens information to the user information, and a fourth operation 1640 of indicating compatibility. The first operation 1610 of identifying the one or more removable lens assemblies 120 may be performed by the one or more lens detection sensors 1418a in cooperation with the controller 1450. The first operation 1610 may also include determining lens information. The second operation 1620 of identifying the user may be performed biometrically (e.g., cooperatively by the biometric sensor 1418d in cooperation with controller 1450), by receiving credentials from the user, and/or by user authentication with the external device 1460. The second operation 1620 may also include determining user information. The third operation 1630 of determining lens compatibility is performed by comparing the lens information to the user information, for example, with the controller 1450 according to the compatibility determiner 1500. The fourth operation 1640 of indicating compatibility is performed, for example, with the head-mounted display unit 110 as operated by the controller 1450. If compatible, a positive indication is provided, which may be usual operation of the display system 100. If incompatible, a negative indication is provided reflecting incompatibility (e.g., by the head-mounted display unit 110 as operated by the controller 1450).

Figure 17:
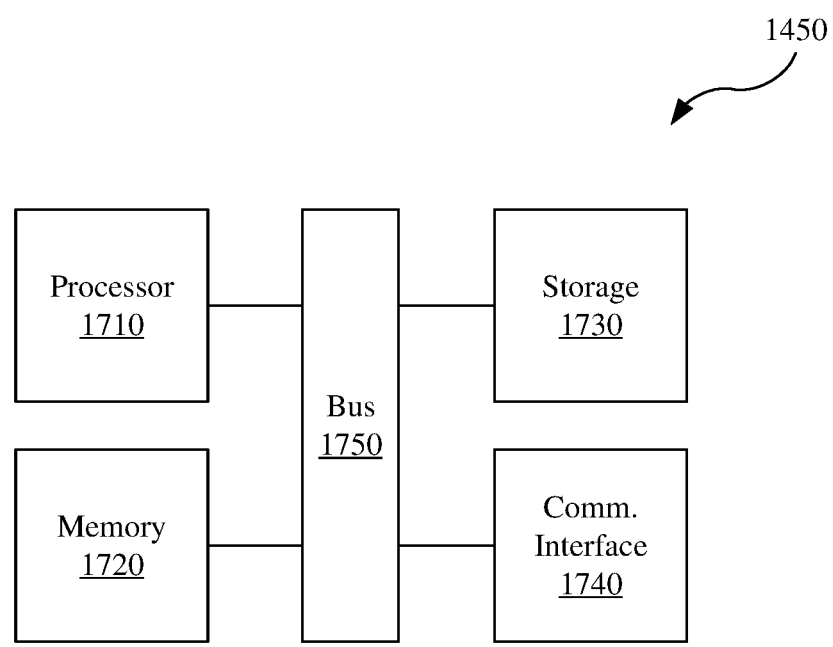
FIG. 17 is a schematic of an example hardware configuration of a controller of the display system.

Referring to FIG. 17, an example hardware configuration of the controller 1450 is shown. The controller 1450 is a computing device, which may generally include a processing device 1710 (e.g., a processor or CPU), a memory 1720 (e.g., a volatile short-term memory, such as a random-access memory module), a storage 1730 (e.g., a long-term storage device, such as a hard disk or solid state drive), a communications interface 1740 by which the controller sends and/or receives signals to and/or from other components (e.g., the display module 116 and various sensors), and a bus 1750 by which the other components of the controller 1450 communicate with each other. The controller 1450 may be physically connected to the head-mounted display unit 110 or otherwise be in communication therewith. The display system 100 may include additional controllers 1450 or components thereof. The controller 1450 may include software programming (e.g., stored by the storage 1730) that includes instructions executable by the processing device 1710 to perform the methods and operations described herein.

Figure 18A:
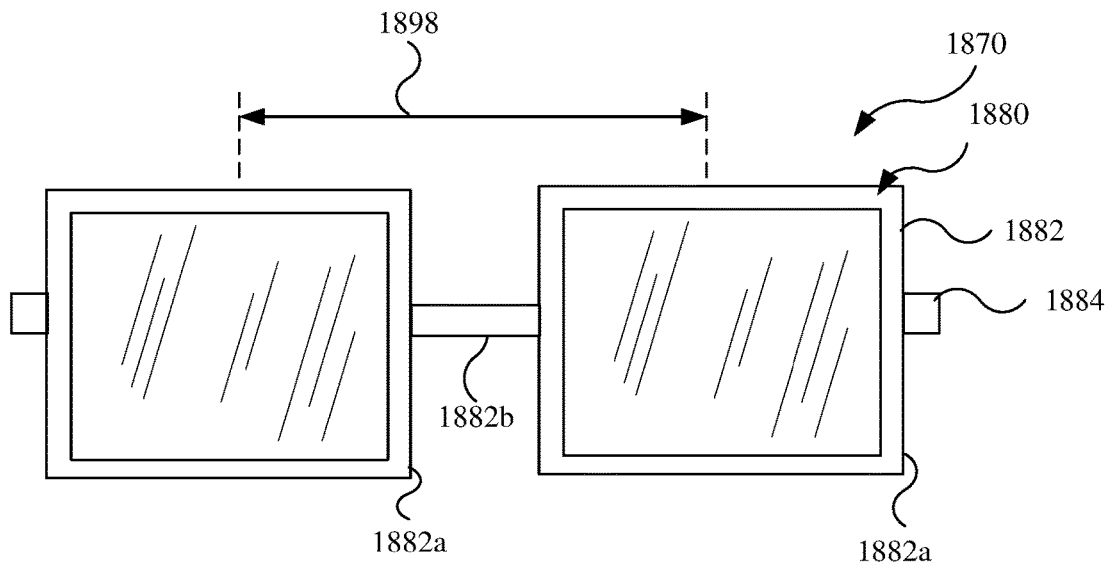
FIG. 18A is a front view of a glasses assembly.
Figure 18B:
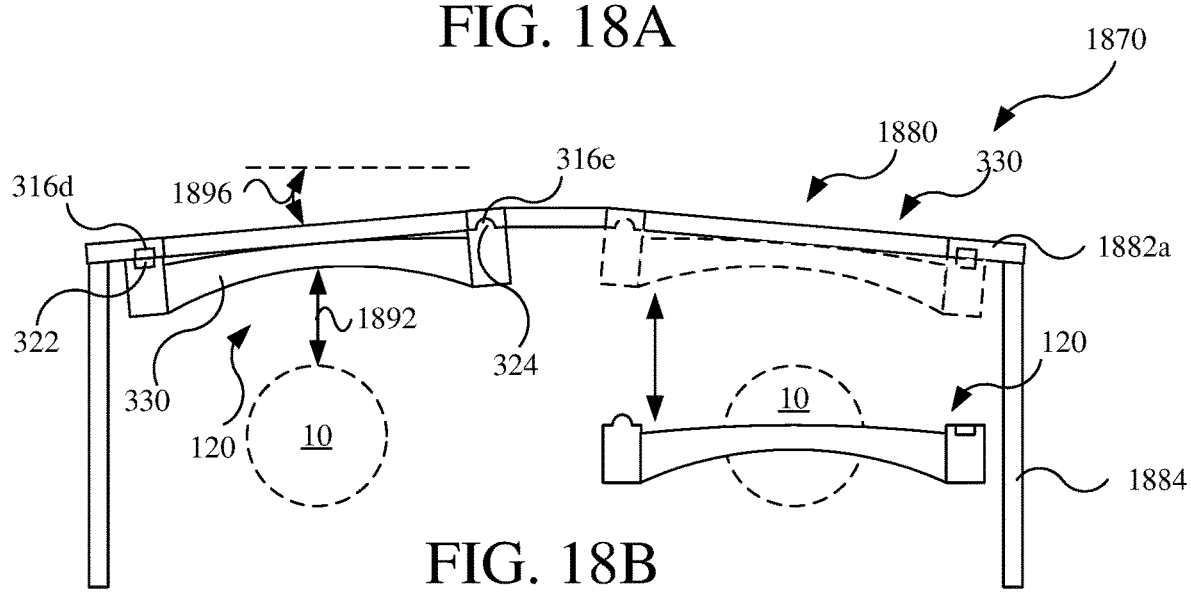
FIG. 18B is a top view of the glasses assembly of FIG. 18A with a removable lens assembly decoupled therefrom.
Figure 18C:
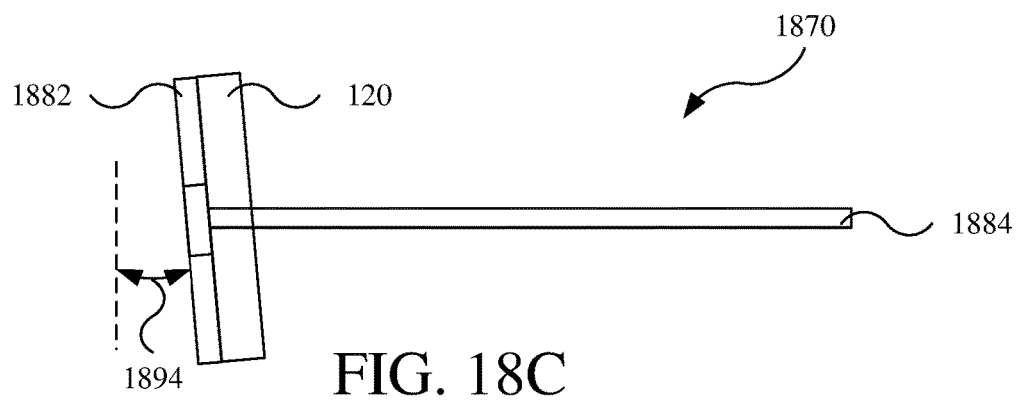
FIG. 18C is a side view of the glasses assembly of FIG. 18A.

Referring to FIGS. 18A-18C, the removable lens assembly 120 or variation thereof (e.g., 1020, 1120, 1220, 1120) may be worn by the user independent of the head-mounted display unit 110. For example, a glasses assembly 1870 includes a glasses frame 1880 to which the removable lens assembly 120 is coupleable (e.g., two of the removable lens assemblies 120, one for each eye). That is, the one or more removable lens assemblies 120 that are usable with the head-mounted display unit 110 are also usable with the glasses assembly 1870. The head-mounted display unit 110, the glasses frame 1880, and the one or more (e.g., a pair of) removable lens assemblies 120 that are coupleable to both the head-mounted display unit 110 and the glasses frame 1880 may be cooperatively referred to as a display and vision correction system.

The glasses frame 1880 generally includes, for example, a forward portion 1882 that includes two lens mounts 1882*a* connected by a nose bridge 1882*b*. The glasses frame 1880 further includes two bows 1884 that are coupled to and extend rearward from the forward portion 1882.

Figure 19A:
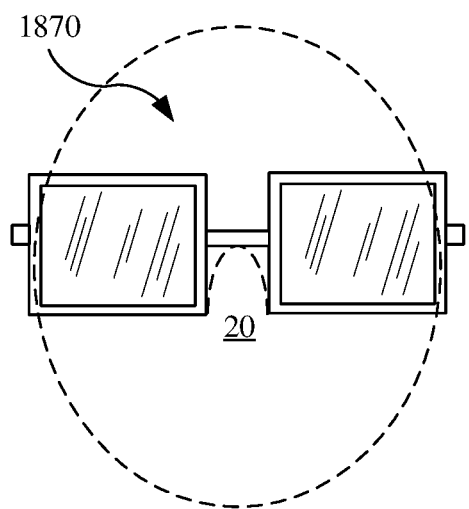
FIG. 19A a front schematic view of a person wearing the glasses assembly of FIG. 18A.
Figure 19B:
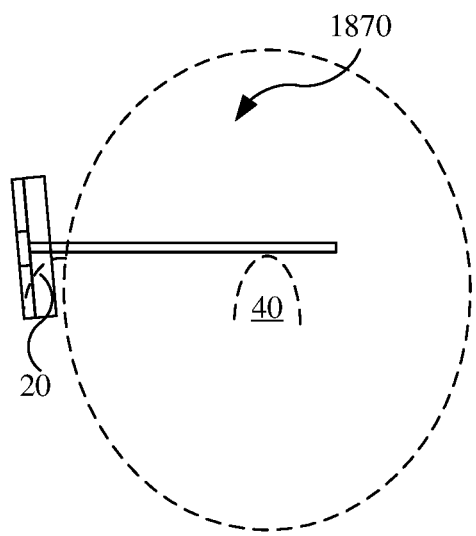
FIG. 19B is a side schematic view of the person wearing the glasses assembly of FIG. 18A.

Referring additionally to FIGS. 19A-19B, the glasses frame 1880 engages the face of the user to support the removable lens assemblies 120 thereon in a predetermined position for vision correction when viewing the environment therethrough, which may be referred to as a vision correction wear position. As with conventional glasses, a nose piece and the two bows 1884 are configured to engage the face of the user, in particular the nose 20 and ears 40, to support the glasses frame 1880 and the removable lens assemblies 120 thereon in the vision correction wear position. Thus, the nose 20 and ears 40 of the user function as datums that both support the glasses assembly 1870 thereon and also locate the removable lens assemblies 120 in the vision correction wear position on the face of the user (i.e., with respect to the eyes of the user). While the nose bridge 1882*b* is illustrated as forming the nose piece, it should be noted that the glasses frame 1880 may instead or additionally engage the nose 20 in other manners (e.g., with nose pads, with the removable lens assemblies 120, among others).

Figure 20A:
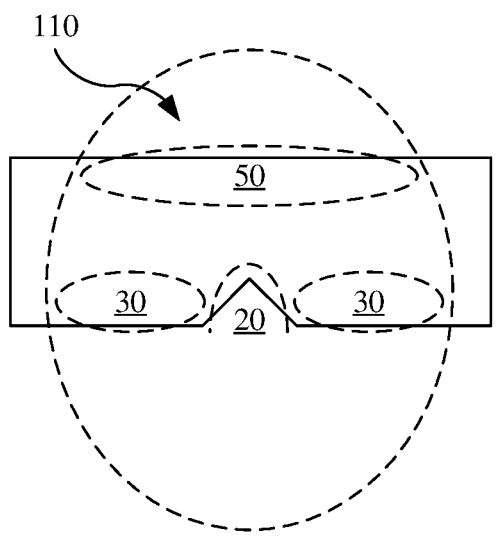
FIG. 20A is a front schematic view of a person wearing the head-mounted display unit of FIG. 1.
Figure 20B:
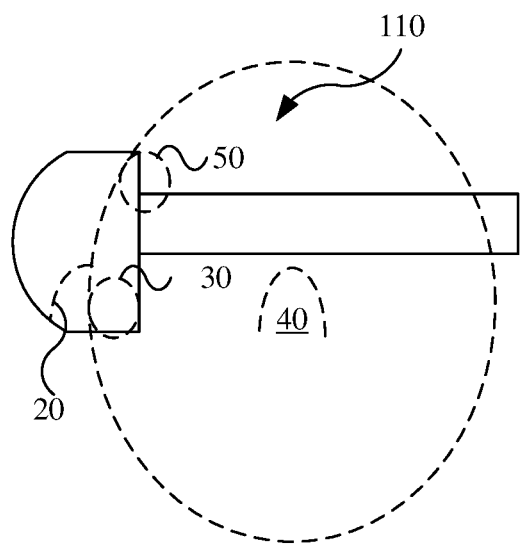
FIG. 20B is a side schematic view of the person wearing the head-mounted display unit of FIG. 1.

In contrast to the glasses assembly 1870, the head-mounted display unit 110 may, as shown in FIGS. 20A and 20B, engage different facial datums to support the head-mounted display unit 110 in a predetermined position that may be referred to as a display wear position. The head-mounted display unit 110 includes the head support 114 that supports the head-mounted display unit 110 on the head of the user, while a facial interface (not labeled) of the housing 112 engages the face of the user. In particular, the facial interface and/or the housing 112 engage facial features of the user (e.g., brows 50 and/or forehead above the user's eyes 10, along with the nose 20 and/or cheeks 30 below the user's eyes 10) that function as datums for locating the head-mounted display unit 110 and, thereby, the removable lens assemblies 120 on the face of the user in the display wear position.

Different sets of facial datums may be used for locating the removable lens assemblies 120 on the face of the user for the glasses assembly 1870 and the head-mounted display unit 110. For example, the glasses assembly 1870 may utilize as the datums the nose 20 and ears of the user, but not the forehead, brow 50, or cheeks 30, while the head-mounted display unit 110 may utilize as the datums one or both of the forehead and/or brows 50 and one or more of the nose 20 and/or cheeks 30, but not the ears. The facial datums should be understood as those facial structures that provide the primary reference points against which and/or on which the glasses assembly 1870 and/or the head-mounted display unit 110 are supported. Facial datums are to be distinguished from other facial features that the glasses assembly 1870 and/or the head-mounted display unit 110 make incidental contact with and/or generally non-supportive contact. For example, the head support 114 may contact the ears but is does not support the head-mounted display unit 110 due to mechanical properties (e.g., the head support 114 includes a flexible fabric) and/or due to discomfort that might otherwise be provide.

The head-mounted display unit 110 and the glasses frame 1880 may be configured to support the removable lens assemblies 120 in substantially the same position of wear relative to the face (e.g., the eyes 10) of the user and/or to each other. That is, the vision correction wear position may be the same as the display wear position. Referring again to FIGS. 18A-18C, the wear positions may be defined according to vertex distance 1892, pantoscopic tilt angle 1894, wrap angle 1896, and/or interpupillary lens distance 1898. The vertex distance 1892 is the distance between the surface of the lens element 330 and the front of the cornea. The pantoscopic tilt angle 1894 is the vertical angle between the lens plane of the lens element 330 and a vertical eye axis. The lens wrap angle 1896 is the horizontal angle between the lens plane and the vertical eye axis. The interpupillary lens distance 1898 is the horizontal distance between centers of the lens elements 330, which is a different measurement from the interpupillary eye distance (i.e., distance between the pupils of the eyes 10 of the user) but may preferably have the same value.

Alternatively, contemplating different usage scenarios and user behavior, the head-mounted display unit 110 and the glasses frame 1880 are configured to have different positions of wear, such that that the removable lens assemblies 120 are held by the head-mounted display unit 110 and the glasses frame 1880 in different positions and/or orientations relative to the eyes 10 of the user. Furthermore, different glasses frames 1880 for a single user may be configured to have different positions of wear, for example, depending on the activity.

In one example, the pantoscopic tilt angle 1894 of the glasses assembly 1870 may different than that of the head-mounted display unit 110, for example, being higher if intended for reading or other activities during which the user is expected to look more downward or being lower if used for sports or other activities during which the user is expected to look more upward.

In another example, the vertex distance 1892 of the glasses assembly 1870 may be different than that of the head-mounted display unit 110, for example, being higher (e.g., to prevent contact of the removable lens assembly 120 with the nose 20 of the user) or lower (e.g., because the glasses frame 1880 is omitted).

The glasses frame 1880 and the head-mounted display unit 110 are preferably configured to couple to the removable lens assemblies 120 in the same manner as each other, which may be any one of the coupling configurations described previously (e.g., by using commons ones of the coupling features of the removable lens assemblies 120). Accordingly, the glasses frame 1880 may include one of the lens mounts 316c, 1016c, 1116c, 1216c, 1311 of the various display modules 116, 1016, 1116, 1216, 1310 described previously, while omitting various other features of such display modules (e.g., omitting the display 316a and the primary lens 316b). By omitting the primary lens 316b, the user may view the environment through the lens element 330, which refracts light to provide vision correction, without further refraction for corrective purposes through another lens. Such coupling features (e.g., mechanical and/or magnetic) may be referred to as glasses coupling features (e.g., glasses mechanical coupling features and/or glasses magnetic coupling features).

For example, as is illustrated in FIGS. 3A-3B and 18A-18F, the removable lens assembly 120 and the glasses frame 1880, as may be the head-mounted display unit 110, are configured for coupling in the manner described above with respect to the lens mount 316c. The removable lens assembly 120 includes the magnetic coupling feature 322 and the mechanical engagement feature 324, while the glasses frame 1880 includes the lens mount 316c, including the magnetic coupling feature 316d and the mechanical engagement feature 316e corresponding thereto.

In an example, as illustrated in FIGS. 10A-10B, the removable lens assembly and the glasses frame 1880, as well as the head-mounted display unit 110, are configured for coupling with an interference fit, such as in the manner described with respect to the lens mount 1016c and the removable lens assembly 1120. The removable lens assembly 1020 includes the lens frame 1040 having 214 the barrel 1042 with the annular protrusion 1044, while the glasses frame 1880 includes the barrel 1016d with the annular protrusion 1016e corresponding thereto for coupling therewith.

In an example, the removable lens assembly and the glasses frame 1880, as well as the head-mounted display unit 110, are configured for coupling with retractable mechanisms, such as in the manner described with respect to the lens mount 1116c and the removable lens assembly 1120. The removable lens assembly includes retractable latches 1122, while the glasses frame 1880 includes receptacles 1116d having lips 1116e that are engaged by the retractable latches 1122 for coupling thereto. Alternatively, the glasses frame 1880 may include the retractable latches that instead engaged receptacles of the removable lens assembly 1120.

In other examples, the removable lens assembly and the glasses frame 1880 may couple to each other with tabs/detents (FIGS. 12A-12B), friction (FIG. 12C), and/or retractable pins (FIG. 12D).

In an example, the removable lens assembly and the glasses frame 1880, as may be the head-mounted display unit 110, are configured for coupling as described with respect to FIGS. 13A-13F (e.g., with a toe-in feature). The removable lens assembly 1320 includes the lens mechanical coupling feature 1322 and the lens magnetic coupling features 1324, while the glasses frame includes the display mechanical coupling feature 1312 and the display magnetic coupling features 1314 corresponding thereto for coupling therewith.

Figure 21:
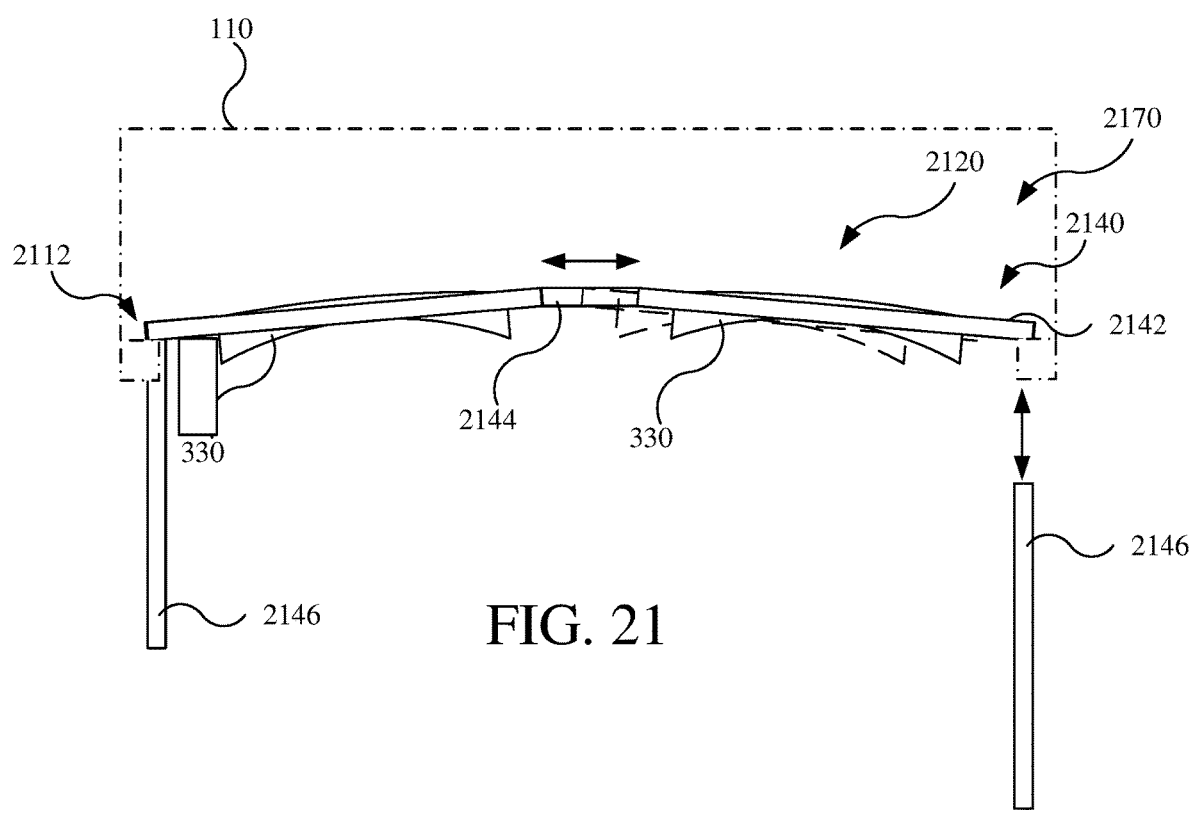
FIG. 21 is a top view of another glasses assembly with a bow decoupled therefrom.

In a still further example shown in FIG. 21, a removable dual-lens assembly 2120 includes two of the lens elements 330 (i.e., one for each eye) and a frame 2140 coupled to both of the lens elements 330 (e.g., being surrounding both lens elements 330 and being coupled by a bridge). The frame 2140 generally includes lens support portions 2142 (e.g., rims) that are coupled to the lens elements 330 (e.g., surrounding) and a bridge 2144 coupling the lens support portions 2142 to each other. Bows 2146 may optionally be provided, which are removably coupleable to the frame 2140, so as to form a glasses assembly 2170 that is supportable on the head of the user. The bridge 2144 or other portion or components of the frame 2140 and the bows 2146 engage the facial datums (i.e., nose 20 and ears) to place the lens elements 330 in the correction wear position. The bows 2146 may couple to the lens support portions 2142 in any suitable manner to facilitate removability, such as with magnetic coupling features, a latch, and/or male female interface. When coupled to the lens support portions 2142, the bows 2146 may fold relative thereto, for example, with either the lens support portions 2142 and/or the bows 2146 include hinges.

As indicated by the arrow, the frame 2140 may allow adjustment or other movement between the lens support portions 2142 and, thereby, between the lens elements 330. Such movement may be generally transverse to the optical axes of the two lens elements 330, which may allow for adjusting the frame 2140 to users having different interpupillary distances (e.g., using a lead screw or other mechanism in the bridge 2144 for fixedly adjusting the spacing therebetween). In another example, the lens support portions 2142 may be spring-biased apart, thereby allowing compression therebetween (e.g., with a spring mechanism in the bridge 2144). In a still further embodiment, the lens support portions 2142 may be removably coupleable to each other (e.g., by the bridge 2144, such as magnetically).

The removable dual-lens assembly 2120 is removably coupleable to the head-mounted display unit 110 magnetically and/or mechanically in one of the manners described previously (e.g., magnetic and mechanical features as shown in FIGS. 3A-3B, interfitting features as shown in FIGS. 10A-10B, latches as shown in FIGS. 11A-11B, other mechanical mating features as shown in FIGS. 12A-12D, and/or the mechanical coupling features shown in FIG. 13A-13F). In a still further example, the removable dual-lens assembly 2120 may be coupleable via the bridge 2144, for example, with magnetic coupling features that correspond to other magnetic coupling features on the head-mounted display unit 110. Alternatively, as shown in FIG.

21, the removable dual-lens assembly 2120 may be spring-biased (as discussed above) to be compressed to be inserted into a receptacle 2112 of the head-mounted display unit 110 (illustrated in dash-dot lines) and subsequently expand to be retained therein (e.g., with a friction fit and/or in recesses of the head-mounted display unit 110).

The bridge 2144 and a corresponding portion of the head-mounted display unit 110 may, for example, provide for magnetic and/or mechanical coupling therebetween, which cooperatively place the lens elements 330 in the display wear position.

Referring to FIGS. 22A-22C, a glasses assembly 2270 is coupleable to a head-mounted display unit 2210 that is reconfigurable to allow the user to view the environment or graphical content with the glasses assembly 2270. The glasses assembly 2270 generally includes a glasses frame 2280 having a forward portion 2282 and two bows 2284 extending rearward therefrom and includes two corrective lens elements 2230 coupled to the forward portion 2282.

The head-mounted display unit 2210 generally includes a chassis 2212 (see, e.g., 112) with one or more displays 2216 (see, e.g., 116) and a head support 2214 (see, e.g., 114) that engages the head of the user to support the chassis 2212 and the one or more displays 2216 on the head of the user. The head-mounted display unit 2210 is reconfigurable, such that the chassis 2212, cooperatively with the one or more displays 2216, is movable relative to the head support 2214, while the head support 2214 remains engaged with the head of the user. For example, the chassis 2212 may be pivotally coupled to the head support 2214, so as to be movable between a lowered position and a raised position. In the lowered position (shown in FIG. 22A), the chassis 2212 covers the eyes 10 of the user and positions the one or more displays 2216 for displaying graphical content to the user with the corrective lens elements 2230 being arranged therebetween (i.e., such that the user views the graphical content through the corrective lens elements 2230). In the raised position (shown in FIG. 22B), the chassis 2212 is positioned above and does not cover the eyes 10 of the user, while the corrective lens elements 2230 remain positioned in front of the user's eyes 10 (i.e., such that the user views the environment through the corrective lens elements 2230).

The glasses frame 2280 is removably coupleable to the head support 2214. For example, as shown in FIG. 22C, the bows 2284 may be received by receptacles 2214a of the head support 2214. Thus, as the chassis 2212 is moved (e.g., pivoted upward), the glasses assembly 2270 remains coupled to the head support 2214 and positioned for the user to view the environment through the corrective lens elements 2230 thereof. Alternatively, the glasses frame 2280 may be coupled to the head support 2214 in other manners, for example, with magnets or other mechanism. In still further examples, the glasses frame 2280 may omit the bows 2284 in which case the forward portion is otherwise coupled to the head support 2214 (e.g., to a brow member that engages the brow 50 of the user above the eyes 10 of the user). When removed from the head support 2214, the glasses assembly 2270 maybe be worn by the user as conventional glasses (e.g., being supported by the nose 20 and/or ears 40 of the user).

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to accommodate with a head-mounted display unit different corrective lenses for different users. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to accommodate with a head-mounted display unit different corrective lenses for different users. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing or accommodating corrective lenses with a head-mounted display unit, the present technology can be configured to allow users to select to "opt in" or "opt out" of participation in the collection of personal information data during registration for services or anytime thereafter. In another example, users can select not to provide personal information during the initialization process. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, the configuration indication and/or the compatibility indication may be based on non-personal information data or a bare minimum amount of personal information, such as the content being requested by the device associated with a user, other non-personal information available to a lens provider, or publicly available information.

What is claimed is:

1. A method for vision correction comprising:
providing an interchangeable lens assembly having a corrective lens element and a first pair of magnetic coupling features that corresponds both to a second pair of magnetic coupling features of a head-mounted display unit for coupling the interchangeable lens assembly to the head-mounted display unit and to a third pair of magnetic coupling features of a glasses frame for coupling the interchangeable lens assembly to the glasses frame;
determining, via a processor of the head-mounted display unit, lens information from a lens tag of the interchangeable lens assembly from a lens detection sensor of the head-mounted display unit, wherein the lens tag includes a magnetic signature associated with magnetic fields of the first pair of magnetic coupling features and read by the lens detection sensor, and the lens information includes a lens characteristic, prescription information, or a combination thereof;
providing a configuration indication to a user via the head-mounted display unit based on the lens information of the interchangeable lens assembly;
receiving user information of the user; and
providing a compatibility indication to the user via the head-mounted display unit based on comparing the user information and the lens information,
wherein the first pair of magnetic coupling features is configured to be attracted to the second pair of magnetic coupling features and the third pair of magnetic coupling features when the interchangeable lens assembly is in a first position relative to the head-mounted display unit and the glasses frame, and the first pair of magnetic coupling features is configured to be unattracted by the second pair of magnetic coupling features and the third pair of magnetic coupling features when the interchangeable lens assembly is in a second position relative to the head-mounted display unit and the glasses frame.

2. The method of claim 1, wherein the providing includes providing the interchangeable lens assembly with a fourth coupling feature that corresponds both to a fifth coupling feature of the head-mounted display unit for coupling the interchangeable lens assembly to the head-mounted display unit and to a sixth coupling feature of the glasses frame for coupling the interchangeable lens assembly to the glasses frame.

3. The method of claim 2, wherein the fourth coupling feature, the fifth coupling feature, and the sixth coupling feature are mechanical coupling features.

4. The method of claim 3, wherein the fourth coupling feature is a male component, the fifth coupling feature is a female component for receiving the fourth coupling feature, and the sixth coupling feature is a female component for receiving the fourth coupling feature.

5. The method of claim 1, wherein the first pair of magnetic coupling features is receivable by each of the second pair of magnetic coupling features and the third pair of magnetic coupling features.

6. The method of claim 5, wherein the first pair of magnetic coupling features engages each of the second pair of magnetic coupling features and the third pair of magnetic coupling features to prevent movement of the interchangeable lens assembly in directions transverse to, along, and about an optical axis of the corrective lens element.

7. The method of claim 1, wherein the first pair of magnetic coupling features are distributed asymmetrically on the interchangeable lens assembly to prevent incorrect positioning of the interchangeable lens assembly relative to the head-mounted display unit and to the glasses frame.

8. The method of claim 1, wherein the first pair of magnetic coupling features is configured to be repelled by the second pair of magnetic coupling features and the third pair of magnetic coupling features when the interchangeable lens assembly is in the second position relative to the head-mounted display unit and the glasses frame.

9. A display and vision correction system comprising:
a head-mounted display unit configured to be worn on a head of a user and having a display module for providing graphical content to the user;
a glasses frame configured to be worn on the head of the user;
a removable lens assembly that is removably coupleable to the head-mounted display unit and to the glasses frame, the removable lens assembly having a corrective lens element and magnetic coupling features for removably coupling the removable lens assembly to corresponding magnetic coupling features of the head-mounted display unit and to the glasses frame, wherein the magnetic coupling features and the corresponding magnetic coupling features are configured to prevent incorrect positioning of the removable lens assembly relative to the head-mounted display unit and to the glasses frame;
an eye camera configured to generate a first signal associated with observation of an eye of the user and to generate a second signal associated with observation of the removable lens assembly; and
a controller configured to determine an identity of the user based on the first signal and to determine an identity of the removable lens assembly based on the second signal.

10. The display and vision correction system of claim 9, wherein the identity of the removable lens assembly includes a lens identifier, a user identifier, manufacturing information, or a combination thereof.

11. The display and vision correction system of claim 9, wherein the identity of the removable lens assembly includes prescription information.

12. The display and vision correction system of claim 9, wherein the removable lens assembly includes a mechanical coupling feature for removably coupling the removable lens assembly to the head-mounted display unit and the glasses frame.

13. The display and vision correction system of claim 12, wherein the mechanical coupling feature includes a male component that is receivable by female components of the head-mounted display unit and the glasses frame to prevent relative movement of the removable lens assembly in a direction transverse to an optical axis of the corrective lens element.

14. The display and vision correction system of claim 12, wherein the mechanical coupling feature is spaced apart from the magnetic coupling features.

15. The display and vision correction system of claim 9, wherein the magnetic coupling features are distributed asymmetrically on the removable lens assembly to prevent the incorrect positioning of the removable lens assembly relative to the head-mounted display unit and the glasses frame.

16. The display and vision correction system of claim 9, wherein common ones of the magnetic coupling features removably couple the removable lens assembly to the corresponding magnetic coupling features of the head-mounted display unit and also removably couple the removable lens assembly to the corresponding magnetic coupling features of the glasses frame.

17. The display and vision correction system of claim 9, wherein the magnetic coupling features are permanent magnets and the corresponding magnetic coupling features are attractor plates.

18. The display and vision correction system of claim 9, wherein the magnetic coupling features and the corresponding magnetic coupling features prevent relative movement of the removable lens assembly in a direction along an optical axis of the corrective lens element.

19. The display and vision correction system of claim 9, wherein the incorrect positioning is a rotated orientation of the removable lens assembly relative to the head-mounted display unit and to the glasses frame.

20. The display and vision correction system of claim 9, wherein the removable lens assembly includes a lens frame coupled to an outer peripheral surface of the corrective lens element.

21. The display and vision correction system of claim 20, wherein the display module includes a lens mount configured to couple to and support the lens frame of the removable lens assembly.

22. The display and vision correction system of claim 21, wherein opposed axially-facing surfaces of the lens mount and the lens frame have three-dimensional contours that prevent misalignment of the lens frame with respect to the lens mount.

23. The display and vision correction system of claim 9, wherein the eye camera includes an optical reading device, an illuminator, or a QR code scanner.

* * * * *